United States Patent [19]

Sarangdhar et al.

[11] Patent Number: 5,410,710
[45] Date of Patent: Apr. 25, 1995

[54] MULTIPROCESSOR PROGRAMMABLE INTERRUPT CONTROLLER SYSTEM ADAPTED TO FUNCTIONAL REDUNDANCY CHECKING PROCESSOR SYSTEMS

[75] Inventors: Nitin V. Sarangdhar; Dave Papworth, both of Beaverton, Oreg.; P. K. Nizar, El Dorado Hills, Calif.; David G. Carson, Portland, Oreg.

[73] Assignee: Intel Corporation, Santa Clara, Calif.

[21] Appl. No.: 176,136

[22] Filed: Dec. 30, 1993

Related U.S. Application Data

[63] Continuation-in-part of Ser. No. 8,074, Jan. 22, 1993, Pat. No. 5,283,904, which is a continuation-in-part of Ser. No. 632,149, Dec. 21, 1990, abandoned.

[51] Int. Cl.$^6$ .................... G06F 13/26; G06F 13/18
[52] U.S. Cl. .................... 395/725; 395/325; 364/241.2; 364/230.2; 364/280.8; 364/240; 364/240.2; 364/DIG. 1
[58] Field of Search .................... 395/725, 325, 275; 371/68.3, 25.1; 340/825.51, 825.5; 370/85.6

[56] References Cited

U.S. PATENT DOCUMENTS

| | | | |
|---|---|---|---|
| 4,860,196 | 8/1989 | Wengert | 395/550 |
| 4,903,270 | 2/1990 | Johnson et al. | 371/68.1 |
| 4,914,580 | 4/1990 | Jensen et al. | 395/325 |
| 4,930,070 | 5/1990 | Yonekuza et al. | 395/725 |
| 5,125,093 | 6/1992 | McFarland | 395/725 |
| 5,179,707 | 1/1993 | Piepho | 395/725 |
| 5,210,828 | 5/1993 | Bolan et al. | 395/200 |
| 5,265,215 | 11/1993 | Fukuda et al. | 395/325 |
| 5,276,690 | 1/1994 | Lee et al. | 371/3 |
| 5,282,272 | 1/1994 | Guy et al. | 395/275 |
| 5,283,904 | 2/1994 | Carson et al. | 395/725 |

OTHER PUBLICATIONS

Val Popescu et al., "The Metaflow Architecture," IEEE Micro, pp. 10–13 and 63–73 (Jun. 1991).

Primary Examiner—Gopal C. Ray
Attorney, Agent, or Firm—Blakely, Sokoloff, Taylor & Zafman

[57] ABSTRACT

A multiprocessor programmable interrupt controller system, for use in a multiprocessor system in which one processor unit is a functional redundant checking (FRC) unit, has a synchronous interrupt bus, distinct from the system (memory) bus, with an interrupt bus clock that has a frequency that is a subharmonic of the FRC unit master CPU clock, for handling interrupt request (IRQ) related messages and maintaining synchronism between the master and checker CPUs of the FRC unit. Additional embodiments provide for the use of D-type flip-flop synchronizers to accommodate FRC units whose internal (core) clock or external bus clock are not harmonically related to the interrupt clock frequency. Each processor unit has an interrupt acceptance unit (IAU) coupled to the interrupt bus for the acceptance of IRQs and for broadcasting of IRQs generated by its associated on-chip processor. I/O device interrupt lines are connected to one or more interrupt delivery units (IDUs) that are each coupled to the interrupt bus for broadcasting of I/O-generated IRQs. The interrupt bus is a synchronous three-wire bus having one clock wire and two data wires for 2-bit parallel-serial data transmission. Arbitration for control of the interrupt bus by the IAUs and IDUs uses one of the data wires. Lowest priority IRQ delivery mode uses a similar one-wire arbitration procedure for determining which IAU has the lowest current priority task running in its associated on-chip processor. A modification to the lowest priority mode arbitration procedure also provides for uniform distribution of IRQs to eligible processors. The actual servicing of the IRQs is done by means of the system bus.

15 Claims, 26 Drawing Sheets

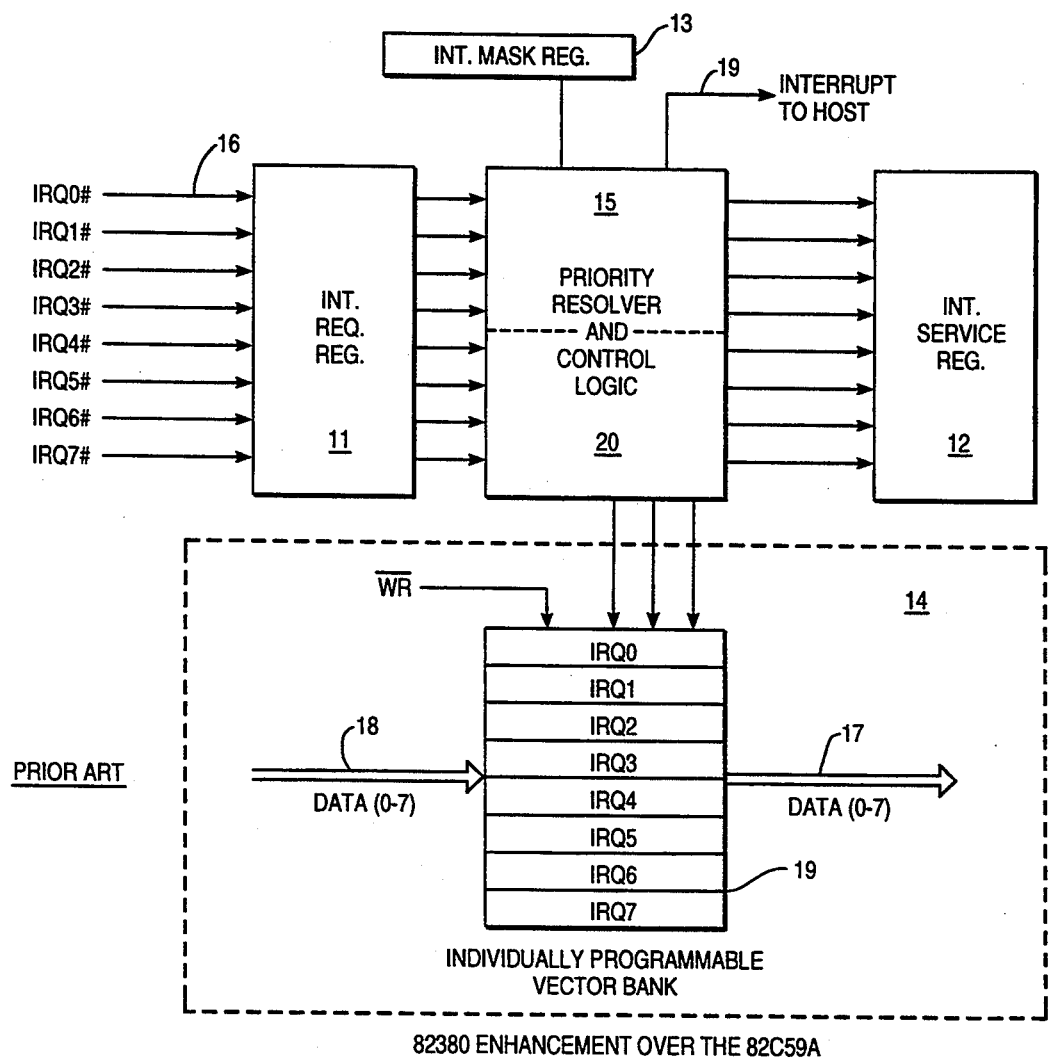
PRIOR ART
82380 ENHANCEMENT OVER THE 82C59A
FIG_1

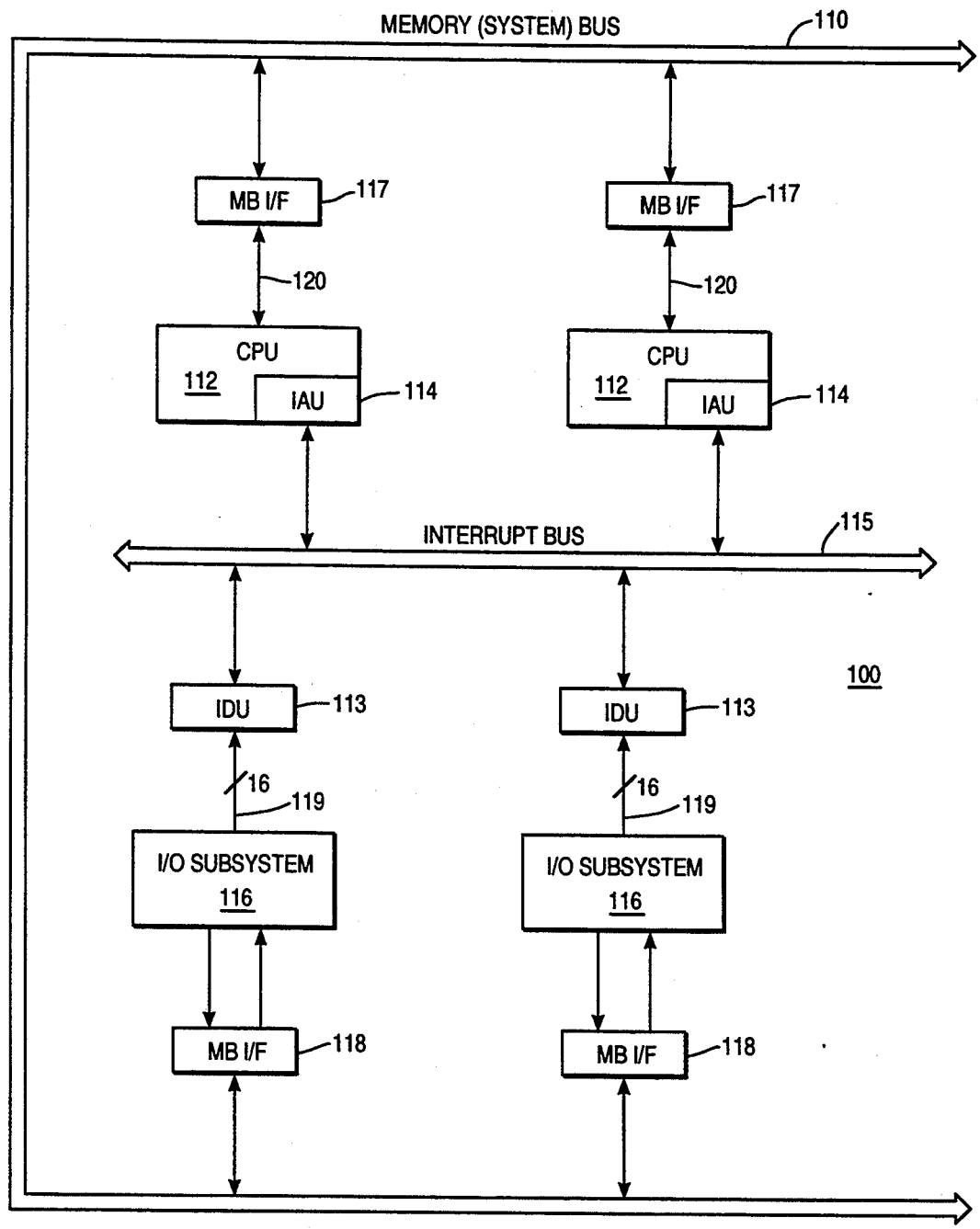
FIG_2

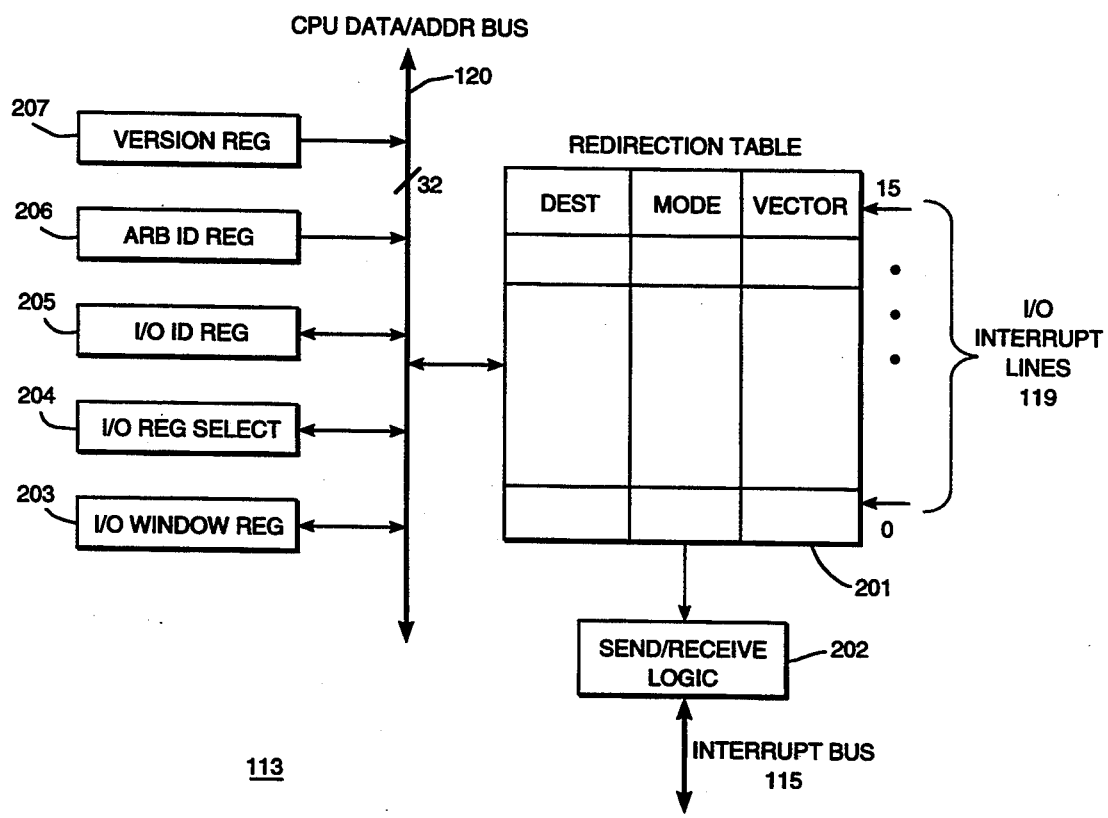
FIG_3

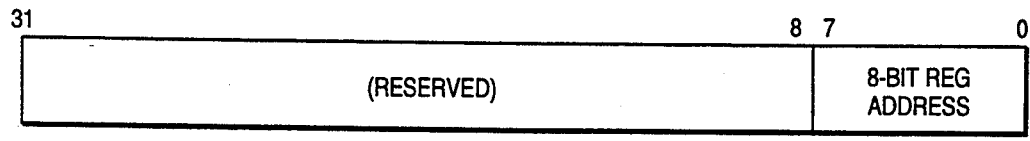
FIG_4
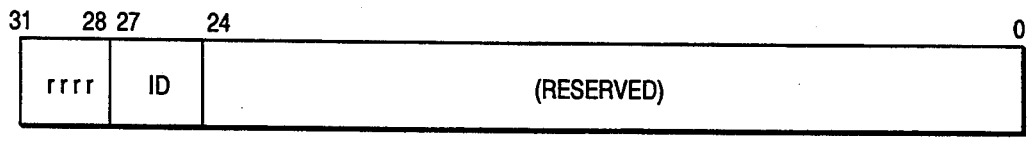
FIG_5
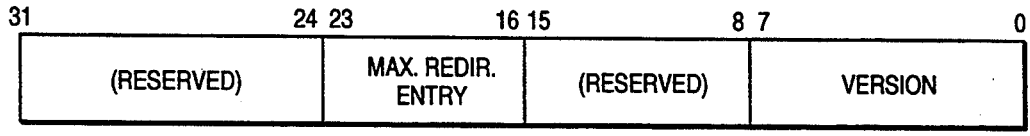
FIG_6

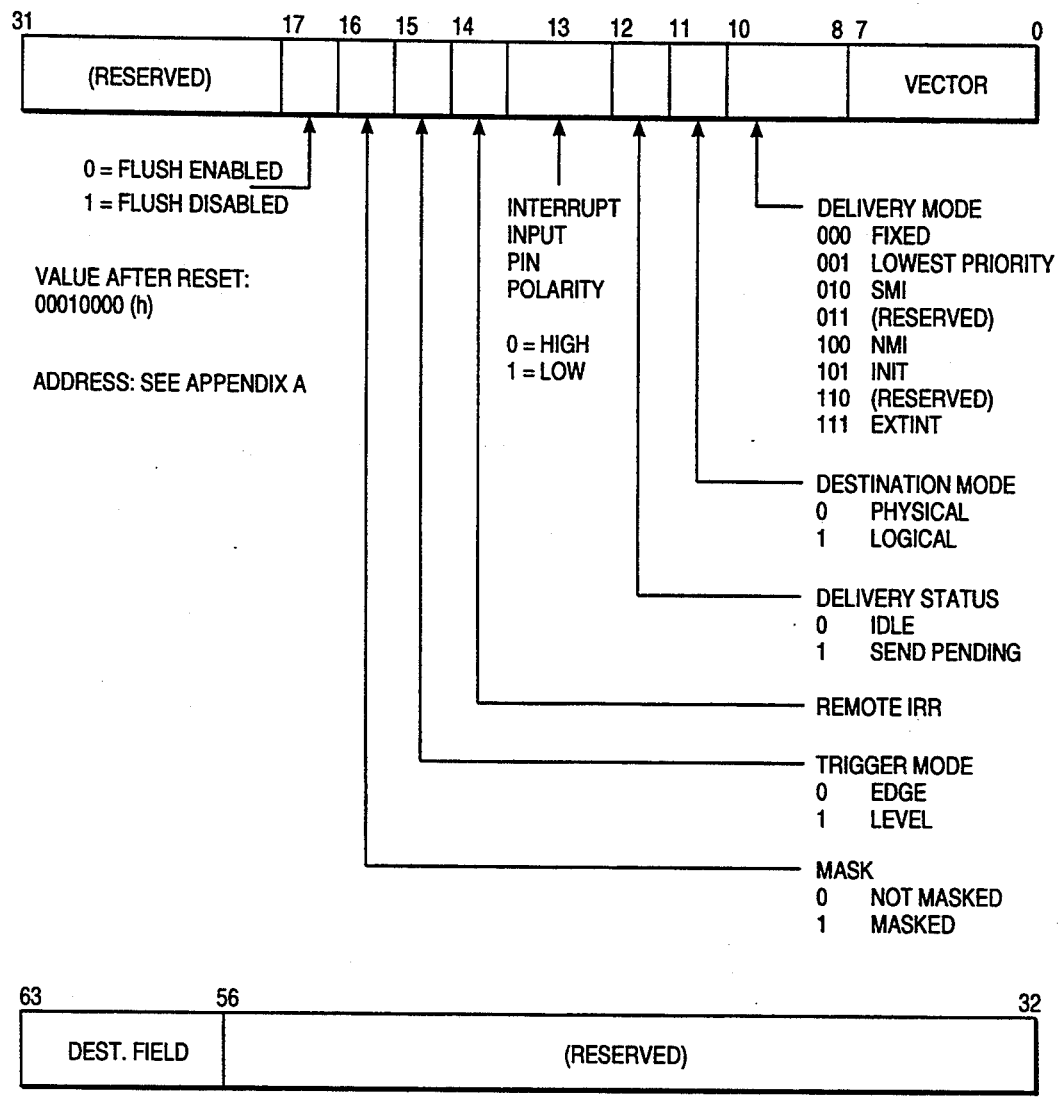
FIG_7

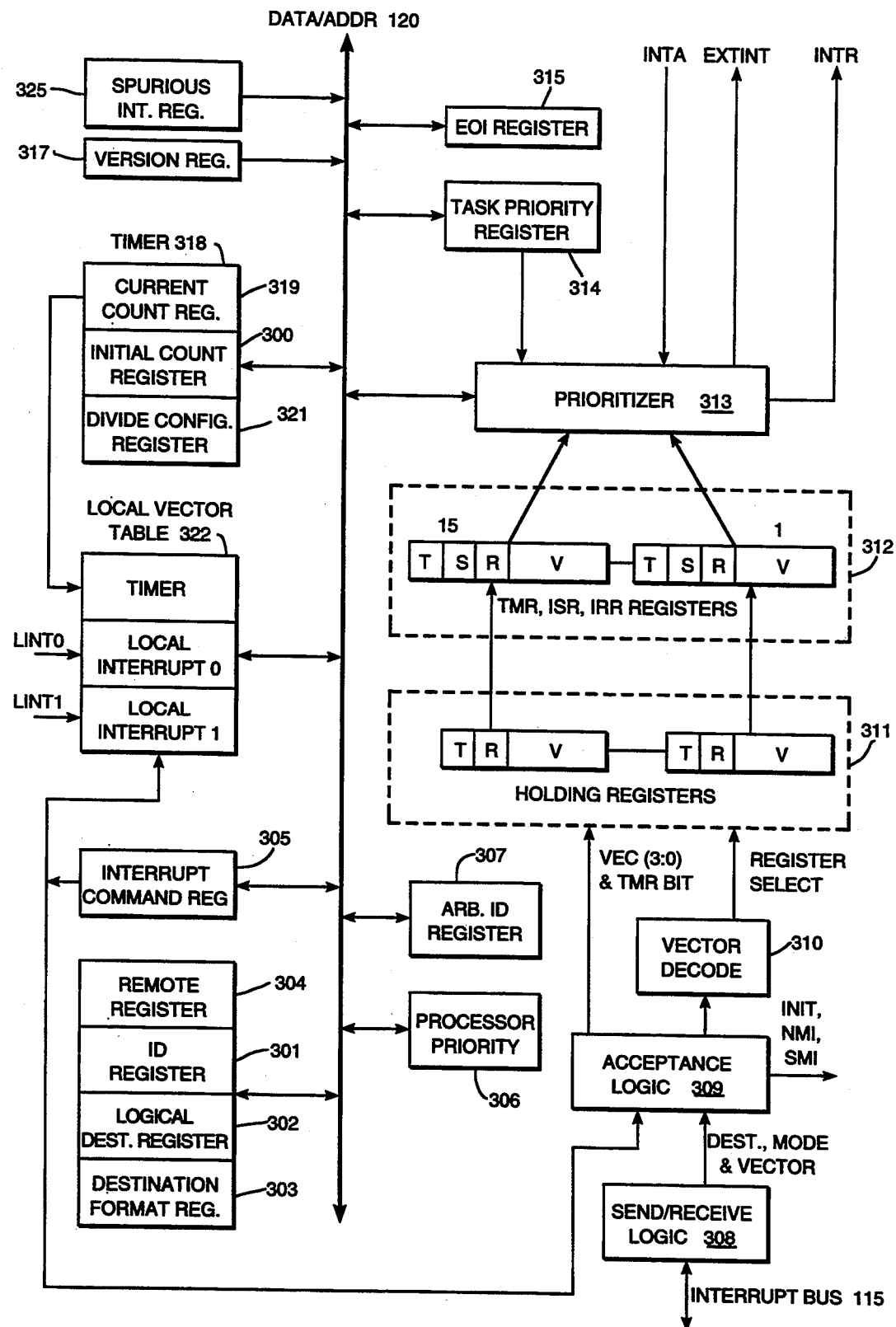
FIG_8

| 31 | 27 24 | | 0 |
|---|---|---|---|
| rrrr | MPIC ID | (RESERVED) | |

ADDRESS: FEE0_0020

FIG_9

| 31 | 28 | | 0 |
|---|---|---|---|
| | (RESERVED) ALL 1'S | | |

↑ 0000 = CLUSTER MODE; 111 = FLAT MODE

ADDRESS: FEE0_00E0
VALUE AFTER RESET: FFFF

FIG_10

| 31 | 24 | | 0 |
|---|---|---|---|
| LOGICAL DEST FIELD | (RESERVED) | | |

ADDRESS: FEE0_00D0
VALUE AFTER RESET: 0000

FIG_11

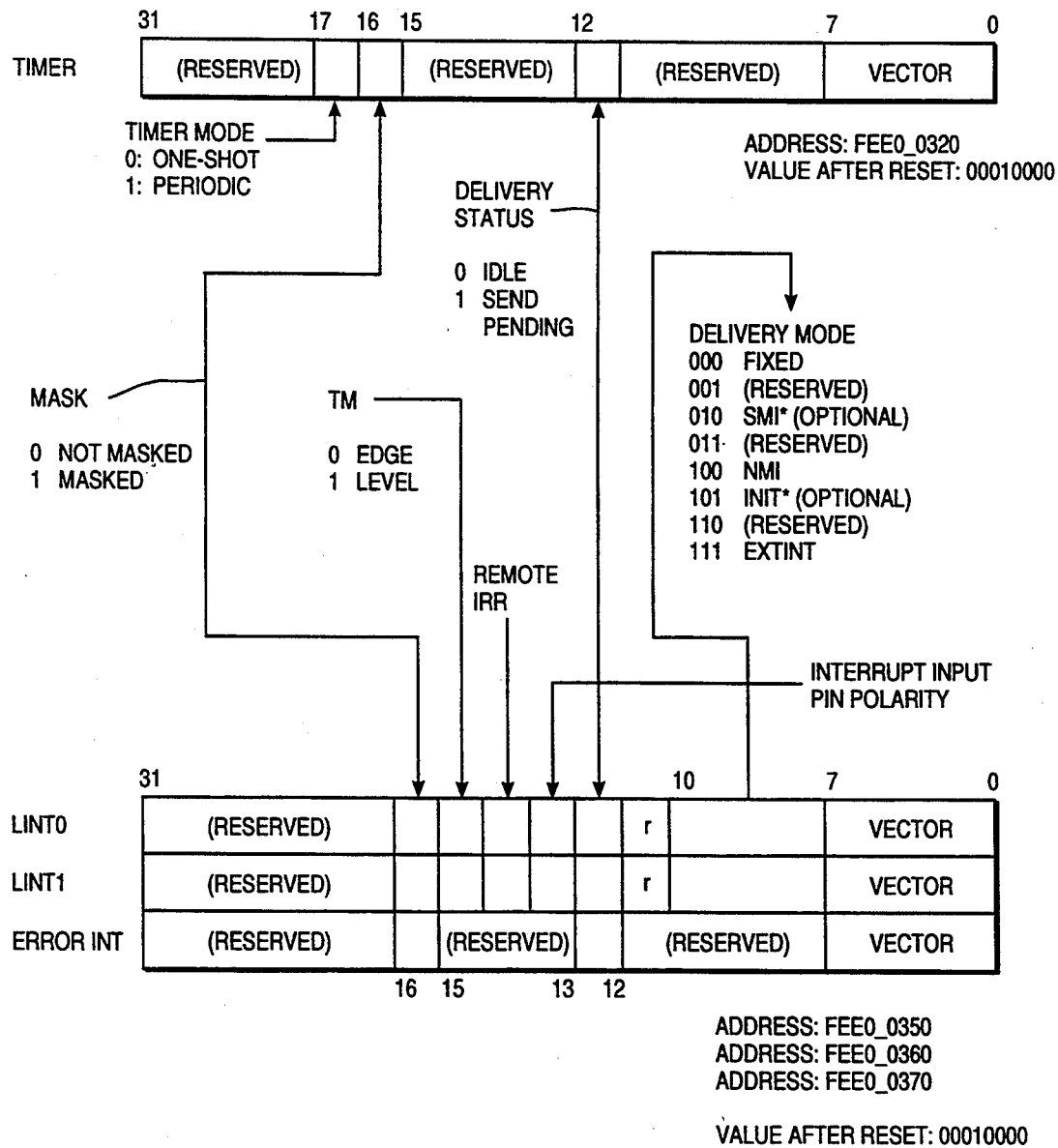
FIG_12

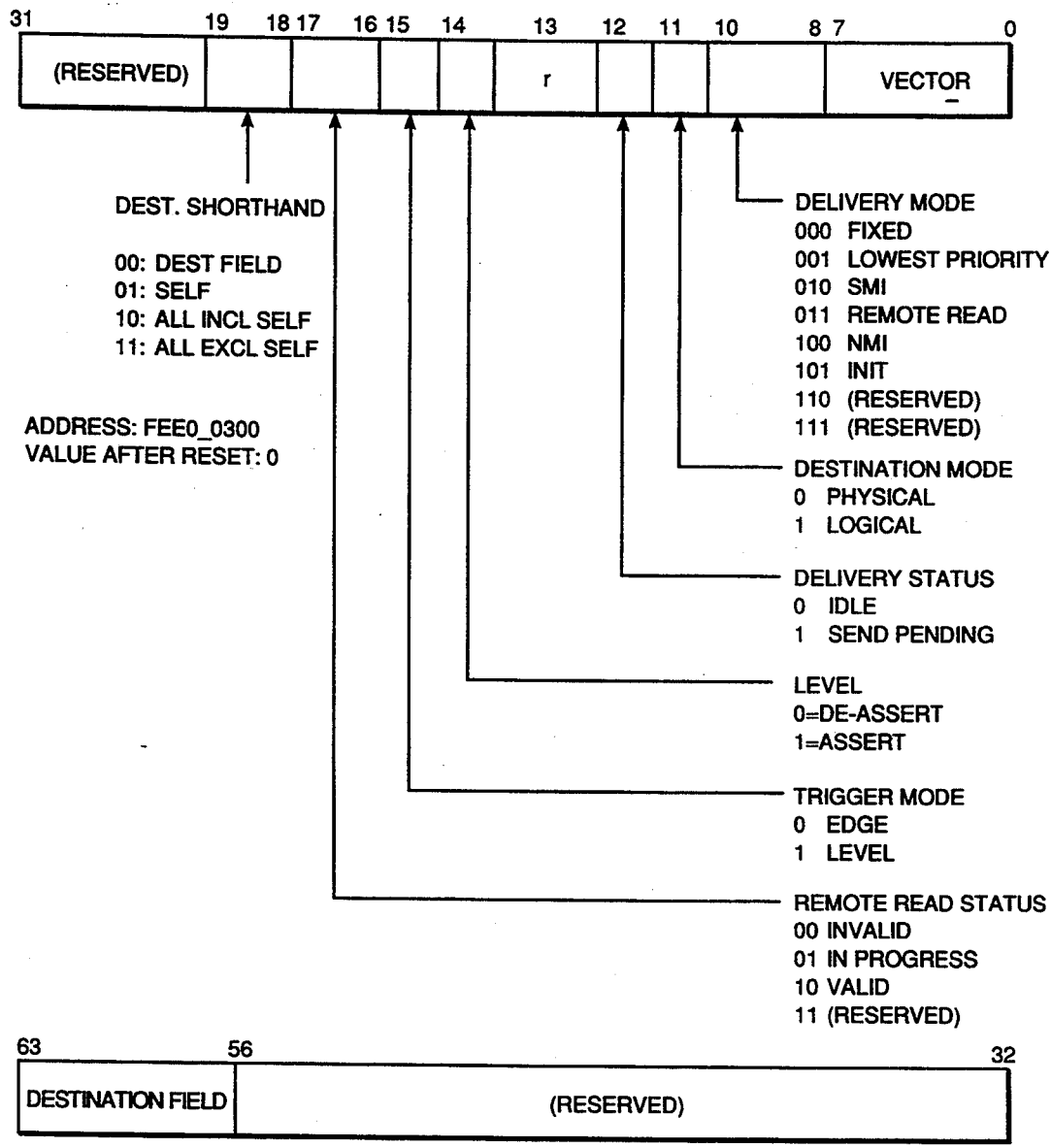
FIG_13

```
255                                    16 15           0
┌──────────────────────────────────────┬──────────────┐
│                                      │  (RESERVED)  │  IRR
├──────────────────────────────────────┼──────────────┤
│                                      │  (RESERVED)  │  ISR
├──────────────────────────────────────┼──────────────┤
│                                      │  (RESERVED)  │  TMR
└──────────────────────────────────────┴──────────────┘
```

ADDRESS: SEE APPENDIX A
VALUE AFTER RESET: 0

FIG_14

```
31                                          8 7        0
┌──────────────────────────────────────────┬──────────┐
│              (RESERVED)                  │   TASK   │
│                                          │ PRIORITY │
└──────────────────────────────────────────┴──────────┘
```

ADDRESS: FEE0_0080
VALUE AFTER RESET: 0

FIG_16

```
31                              10  9  8  7           0
┌──────────────────────────────┬───┬───┬──────────────┐
│         (RESERVED)           │   │   │   ****1111   │
└──────────────────────────────┴───┴───┴──────────────┘
```

FOCUS PROCESSOR CHECKING ─────────┘   │              │
    0: ENABLED                    │              SPURIOUS VECTOR
    1: DISABLED           UNIT ENABLED          ADDRESS: FEE0_00F0
                       0: UNIT DISABLED    VALUE AFTER RESET: 000000FF
                       1: UNIT ENABLED

* PROGRAMMABLE

FIG_17

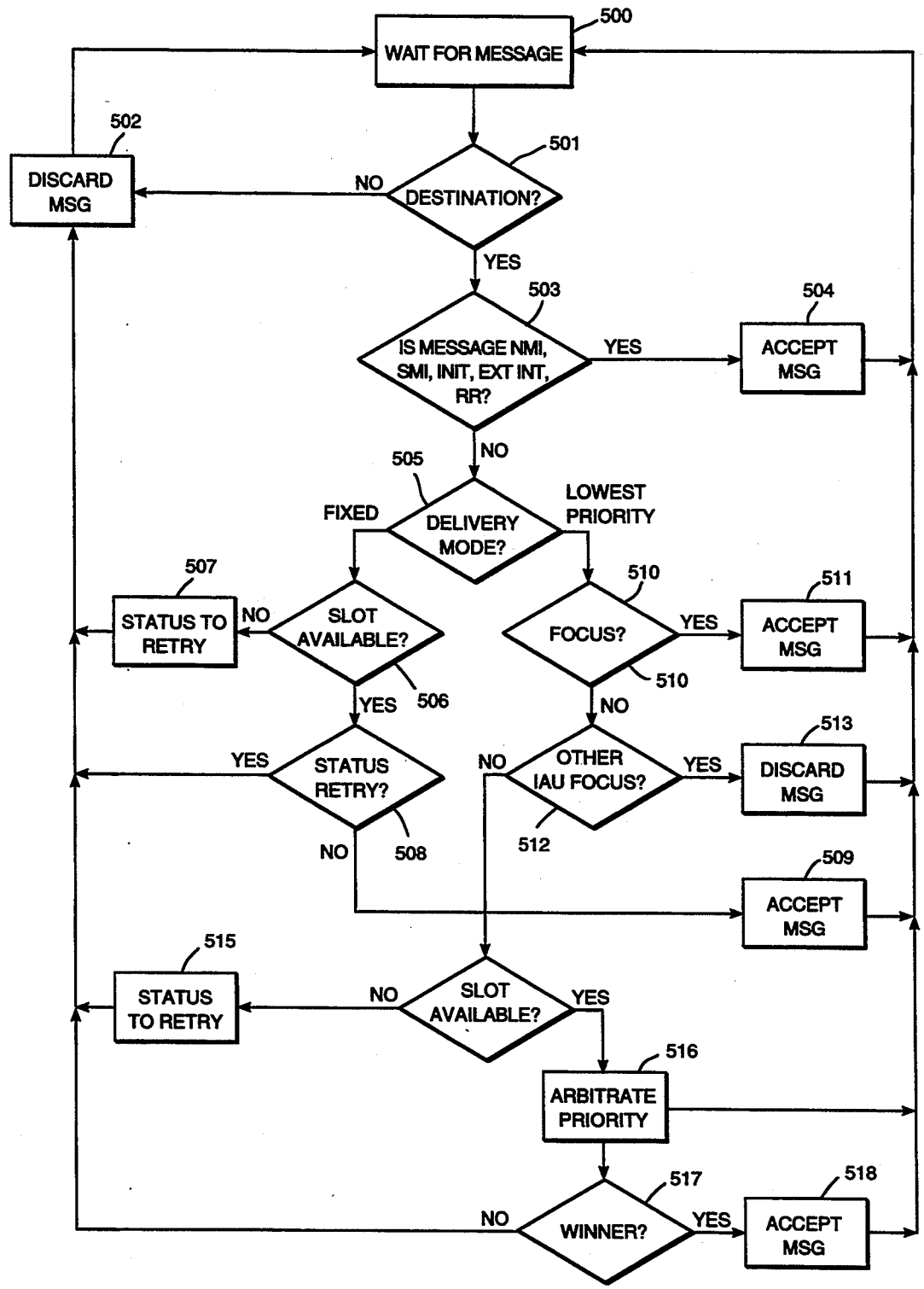
FIG_15

```
31                                                                          0
┌─────────────────────────────────────────────────────────────────────────────┐
│ X X X X X X X X X X X X X X X X X X X X X X X X X X X X X X X X            │
└─────────────────────────────────────────────────────────────────────────────┘
```

X = DON'T CARE

ADDRESS: FEE0_00B0
VALUE AFTER RESET: 0

FIG_18

```
31                                                                          0
┌─────────────────────────────────────────────────────────────────────────────┐
│                                                                             │
└─────────────────────────────────────────────────────────────────────────────┘
```

ADDRESS: FFE0_00C0
VALUE AFTER RESET: 0

FIG_19

| 31         24 | 23    16 | 15    8 | 7    0 |
|---|---|---|---|
| (RESERVED) | MAX. LVT ENTRY | (RESERVED) | VERSION |

VALUE AFTER RESET = 000200vv
vv = VERSION #

ADDRESS: FEE0_0030

FIG_20

| 31    8 | 7 | 6 | 5 | 4 | 3 | 2 | 1 | 0 |
|---|---|---|---|---|---|---|---|---|
| (RESERVED) | ILLEGAL REG. ADRS. | RECEIVE ILLEGAL VECTOR | SEND ILLEGAL VECTOR | (RESERVED) | RECEIVE ACCEPT ERROR | SEND ACCEPT ERROR | RECEIVE CS ERROR | SEND CS ERROR |

ADDRESS: FEE0_0280
VALUE AFTER RESET: 0

FIG_26

| CYCLE | BIT 0 | BIT 1 | |
|---|---|---|---|
| 1 | eoi | 1 | 0 1 = NORMAL, 1 1 = EOI |
| 2 | ArbID3 | 0 | ARBITRATION ID BITS 3 THRU 0 |
| 3 | ArbID2 | 0 | |
| 4 | ArbID1 | 0 | |
| 5 | ArbID0 | 0 | |
| 6 | V7 | V6 | INTERRUPT VECTOR V7 - V0 |
| 7 | V5 | V4 | |
| 8 | V3 | V2 | |
| 9 | V1 | V0 | |
| 10 | C | C | CHECK SUM |
| 11 | 0 | 0 | POSTAMBLE |
| 12 | A | A | STATUS CYCLE 0 |
| 13 | A1 | A1 | STATUS CYCLE 1 |
| 14 | 0 | 0 | IDLE |

FIG_21

| CYCLE | BIT 0 | BIT 1 | |
|---|---|---|---|
| 1 | eoi | 1 | 0 1 = NORMAL, 1 1 = EOI |
| 2 | ArbID3 | 0 | ARBITRATION ID BITS 3 THRU 0 |
| 3 | ArbID2 | 0 | |
| 4 | ArbID1 | 0 | |
| 5 | ArbID0 | 0 | |
| 6 | DM | M2 | DM = DESTINATION MODE |
| 7 | M1 | M0 | M2-M0 = DELIVERY MODE |
| 8 | L | TM | L = LEVEL, TM = TRIGGER MODE |
| 9 | V7 | V6 | V7 - V0 = INTERRUPT VECTOR |
| 10 | V5 | V4 | |
| 11 | V3 | V2 | |
| 12 | V1 | V0 | |
| 13 | D7 | D6 | DESTINATION |
| 14 | D5 | D4 | |
| 15 | D3 | D2 | |
| 16 | D1 | D0 | |
| 17 | C | C | CHECK SUM FOR CYCLES 6 - 16 |
| 18 | 0 | 0 | POSTAMBLE |
| 19 | A | A | STATUS CYCLE 0 |
| 20 | A1 | A1 | STATUS CYCLE 1 |
| 21 | 0 | 0 | IDLE |

FIG_22

STATUS CYCLES DECODING

| DELIVERY MODE | FOCUS PROCESSOR? | BITS A | BITS A | COMMENTS | BITS A1 | BITS A1 | COMMENTS |
|---|---|---|---|---|---|---|---|
| FIXED, EOI | N/A | 0 | 0 | CS IS OK | 1 | 0 | ACCEPTED |
|  |  |  |  |  | 1 | 1 | RETRY |
|  |  |  |  |  | 0 | X | ERROR |
|  |  | 1 | 1 | CS ERROR | X | X |  |
|  |  | 1 | 0 | ERROR | X | X |  |
|  |  | 0 | 1 | ERROR | X | X |  |
| NMI, SMM, RESET, EXTINT | N/A | 0 | 0 | CS IS OK | 1 | 0 | ACCEPTED |
|  |  |  |  |  | 1 | 1 | ERROR |
|  |  |  |  |  | 0 | X | ERROR |
|  |  | 1 | 1 | CS ERROR | X | X |  |
|  |  | 1 | 0 | ERROR | X | X |  |
|  |  | 0 | 1 | ERROR | X | X |  |
| LOWEST PRIO. | NO | 0 | 0 | CS IS OK, NO FOCUS PROC. | 1 | 1 | GO FOR LP ARBITRATION |
|  |  |  |  |  | 1 | 0 | END AND RETRY |
|  |  |  |  |  | 0 | X | ERROR |
|  | YES | 1 | 0 | CS IS OK, FOCUS PROC. | X | X |  |
|  |  | 1 | 1 | CS ERROR | X | X |  |
|  |  | 0 | 1 | ERROR | X | X |  |
| REMOTE READ | N/A | 0 | 0 | CS IS OK | X | X |  |
|  |  | 1 | 1 | CS ERROR | X | X |  |
|  |  | 0 | 1 | ERROR | X | X |  |
|  |  | 1 | 0 | ERROR | X | X |  |

CS = CHECK SUM
N/A = NOT APPLICABLE

FIG_23

| CYCLE | BIT 1 | BIT 0 | |
|---|---|---|---|
| 1 | eoi | 1 | 0 1 = NORMAL, 1 1 = EOI |
| 2 | ArbID3 | 0 | ARBITRATION ID BITS 3 THRU 0 |
| 3 | ArbID2 | 0 | |
| 4 | ArbID1 | 0 | |
| 5 | ArbID0 | 0 | |
| 6 | DM | M2 | DM = DESTINATION MODE |
| 7 | M1 | M0 | M2 - M0 = DELIVERY MODE |
| 8 | L | TM | L = LEVEL, TM = TRIGGER MODE |
| 9 | V7 | V6 | V7 - V0 = INTERRUPT VECTOR |
| 10 | V5 | V4 | |
| 11 | V3 | V2 | |
| 12 | V1 | V0 | |
| 13 | D7 | D6 | DESTINATION |
| 14 | D5 | D4 | |
| 15 | D3 | D2 | |
| 16 | D1 | D0 | |
| 17 | C | C | CHECKSUM FOR CYCLES 6 - 16 |
| 18 | 0 | 0 | POSTAMBLE |
| 19 | A | A | STATUS CYCLE 0 |
| 20 | A1 | A1 | STATUS CYCLE 1 |
| 21 | P7 | 0 | INVERTED PROCESSOR PRIORITY P7 - P0 |
| 22 | P6 | 0 | |
| 23 | P5 | 0 | |
| 24 | P4 | 0 | |
| 25 | P3 | 0 | |
| 26 | P2 | 0 | |
| 27 | P1 | 0 | |
| 28 | P0 | 0 | |
| 29 | ArbID3 | 0 | ARBITRATION ID 3 - 0 |
| 30 | ArbID2 | 0 | |
| 31 | ArbID1 | 0 | |
| 32 | ArbID0 | 0 | |
| 33 | 0 | 0 | IDLE |

FIG_24

| CYCLE | BIT 1 | BIT 0 | |
|---|---|---|---|
| 1 | eoi | 1 | 0 1 = NORMAL, 1 0 = EOI |
| 2 | ArbID3 | 0 | ARBITRATION ID BITS 3 THRU 0 |
| 3 | ArbID2 | 0 | |
| 4 | ArbID1 | 0 | |
| 5 | ArbID0 | 0 | |
| 6 | DM | M2 | DM = DESTINATION MODE |
| 7 | M1 | M0 | M2 - M0 = DELIVERY MODE |
| 8 | L | TM | L = LEVEL, TM = TRIGGER MODE |
| 9 | V7 | V6 | V7 - V0 = INTERRUPT VECTOR |
| 10 | V5 | V4 | |
| 11 | V3 | V2 | |
| 12 | V1 | V0 | |
| 13 | D7 | D6 | DESTINATION |
| 14 | D5 | D4 | |
| 15 | D3 | D2 | |
| 16 | D1 | D0 | |
| 17 | C | C | CHECKSUM FOR CYCLES 6 - 16 |
| 18 | 0 | 0 | POSTAMBLE |
| 19 | A | A | STATUS CYCLE 0 |
| 20 | A1 | A1 | STATUS CYCLE 1 |
| 21 | d31 | d30 | REMOTE REGISTER DATA 31 - 0 |
| 22 | d29 | d28 | |
| 23 | d27 | d26 | |
| 24 | d25 | d24 | |
| 25 | d23 | d22 | |
| 26 | d21 | d20 | |
| 27 | d19 | d18 | |
| 28 | d17 | d16 | |
| 29 | d15 | d14 | |
| 30 | d13 | d12 | |
| 31 | d11 | d10 | |
| 32 | d09 | d08 | |
| 33 | d07 | d06 | |
| 34 | d05 | d04 | |
| 35 | d03 | d02 | |
| 36 | d01 | d00 | |
| 37 | S | S | DATA STATUS: 11 = VALID, 00 = INVALID |
| 38 | C | C | CHECK SUM FOR d31 - d00 |
| 39 | 0 | 0 | IDLE |

FIG_25

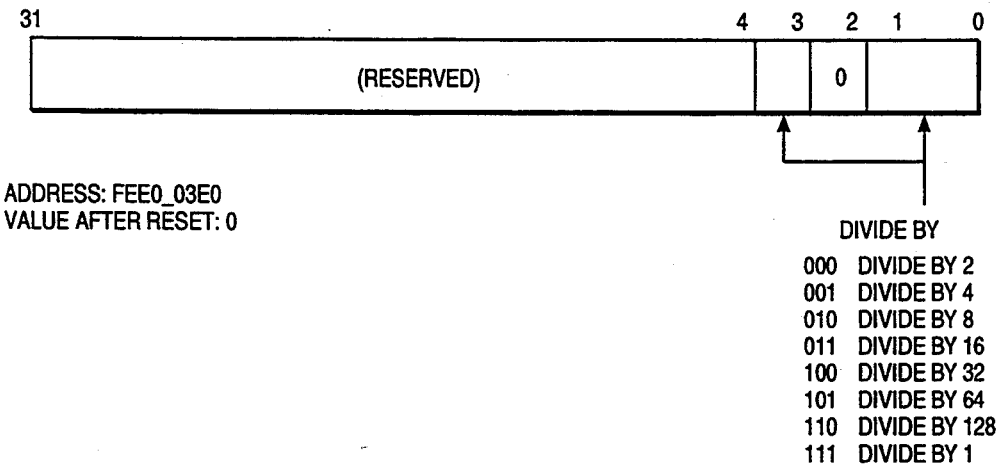
FIG_27
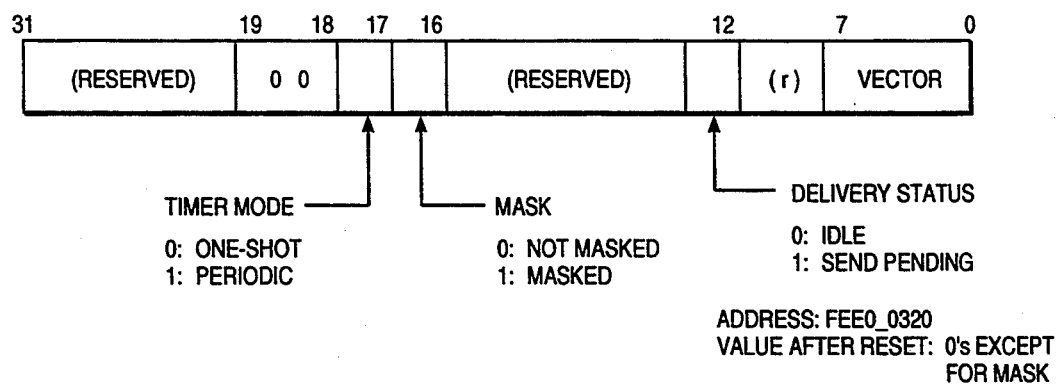
FIG_28

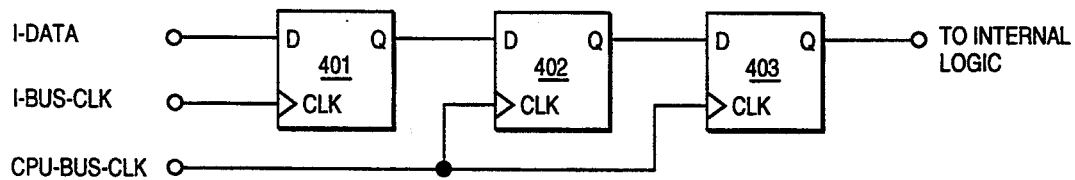
FIG_29
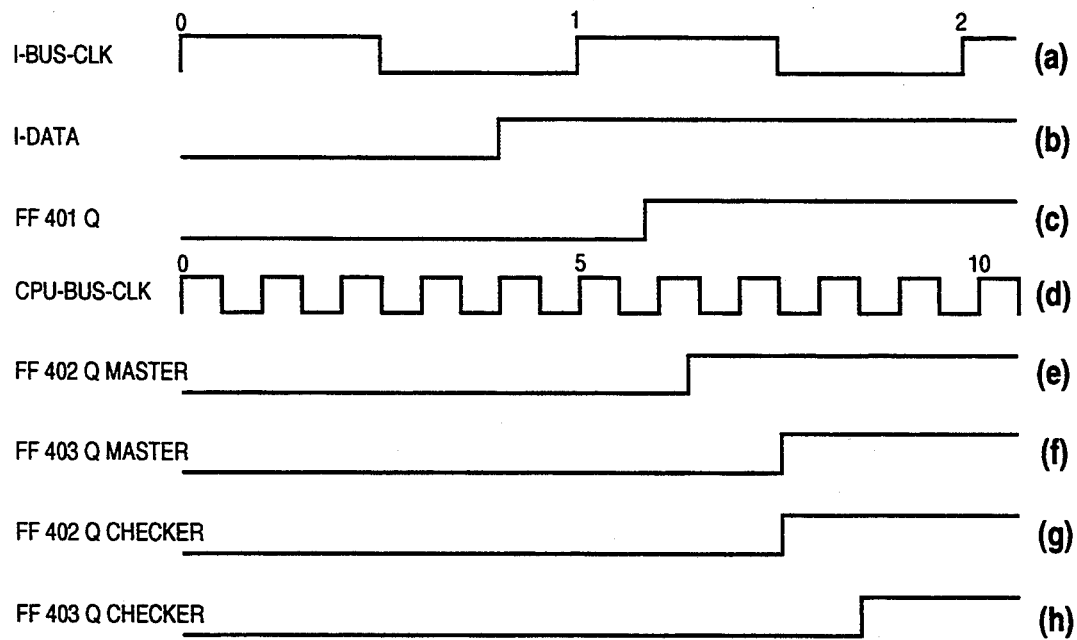
FIG_30

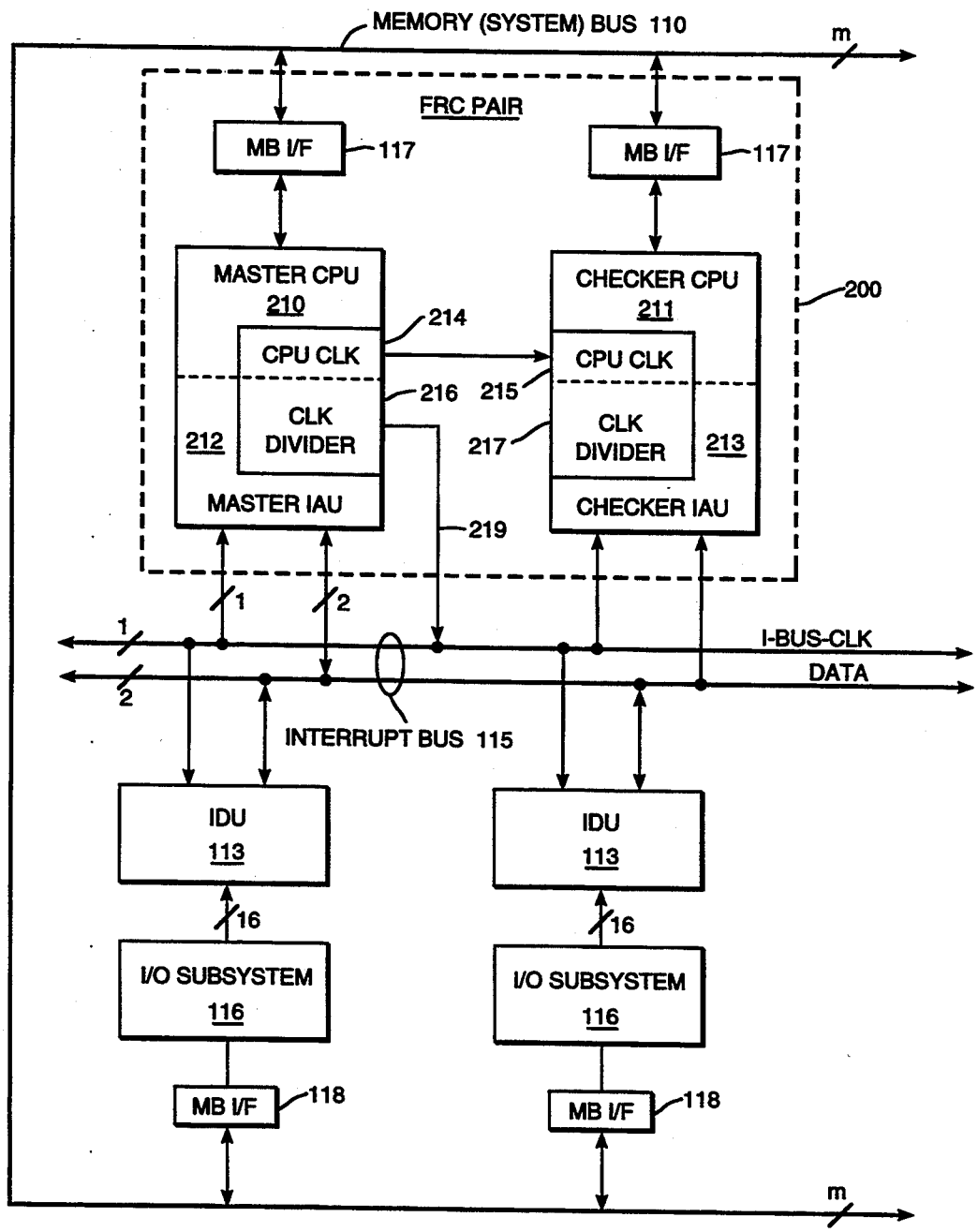
FIG_31

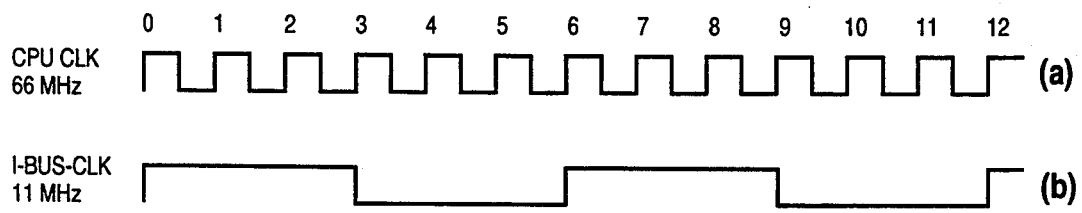
FIG_32
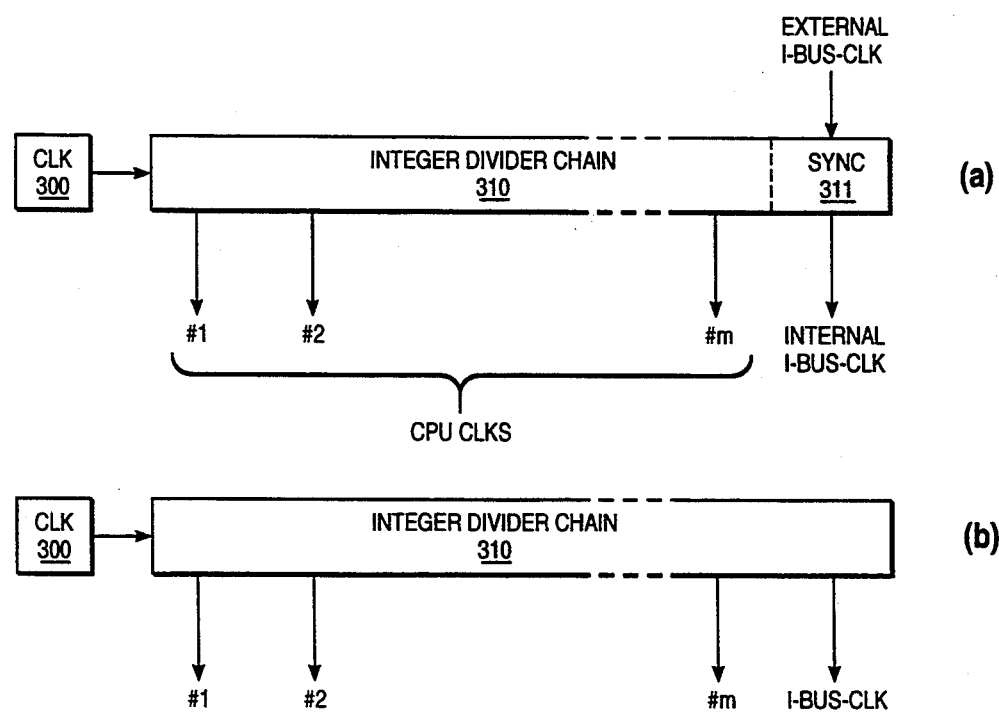
FIG_33

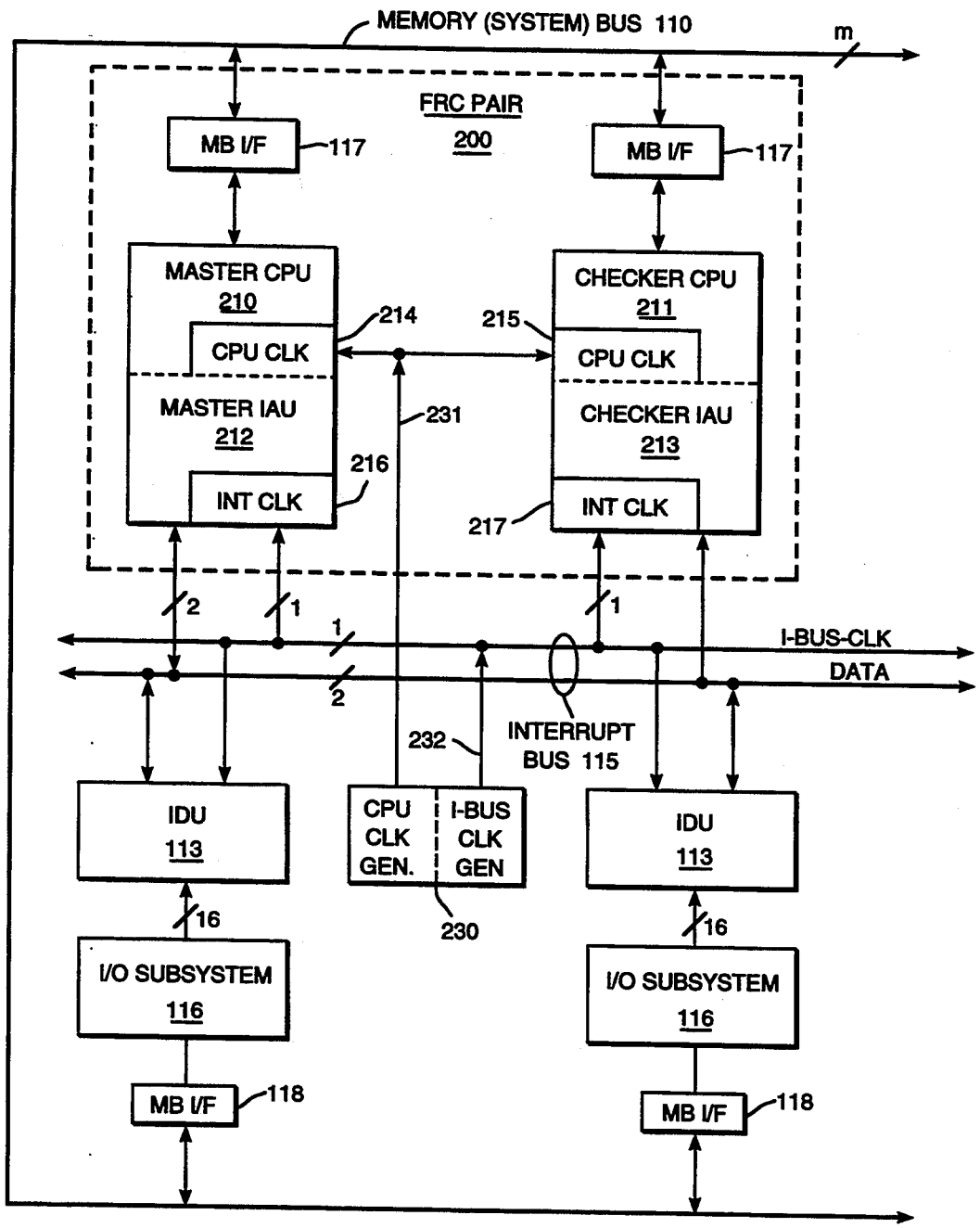
FIG_34

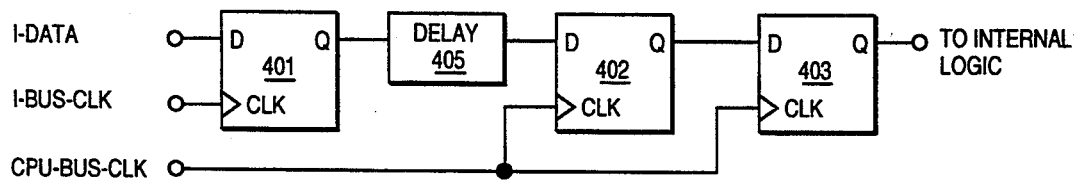
FIG_35
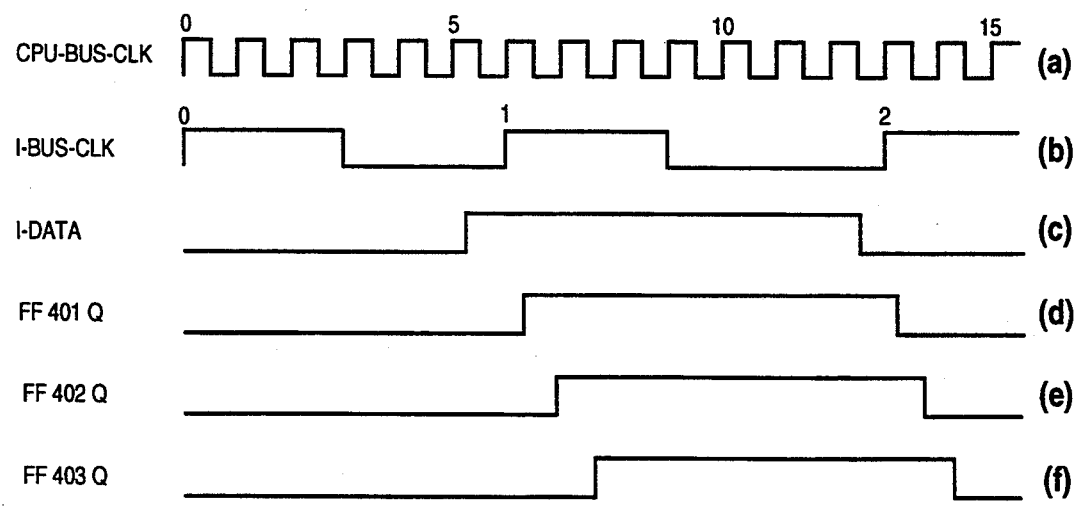
FIG_36

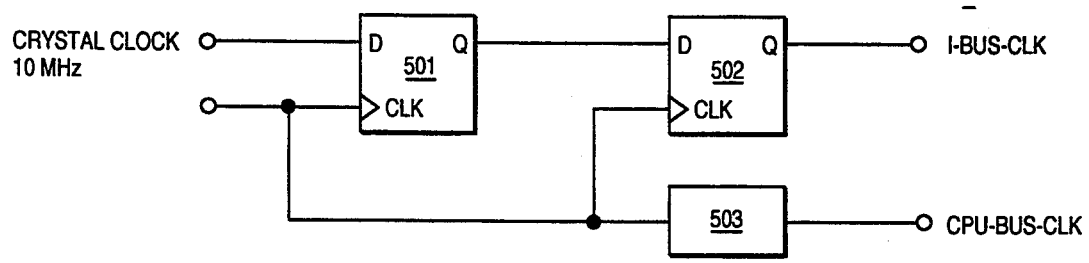
FIG_37
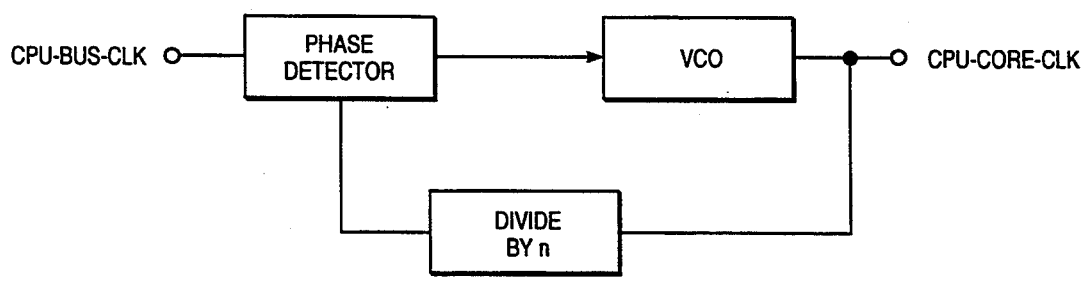
FIG_38

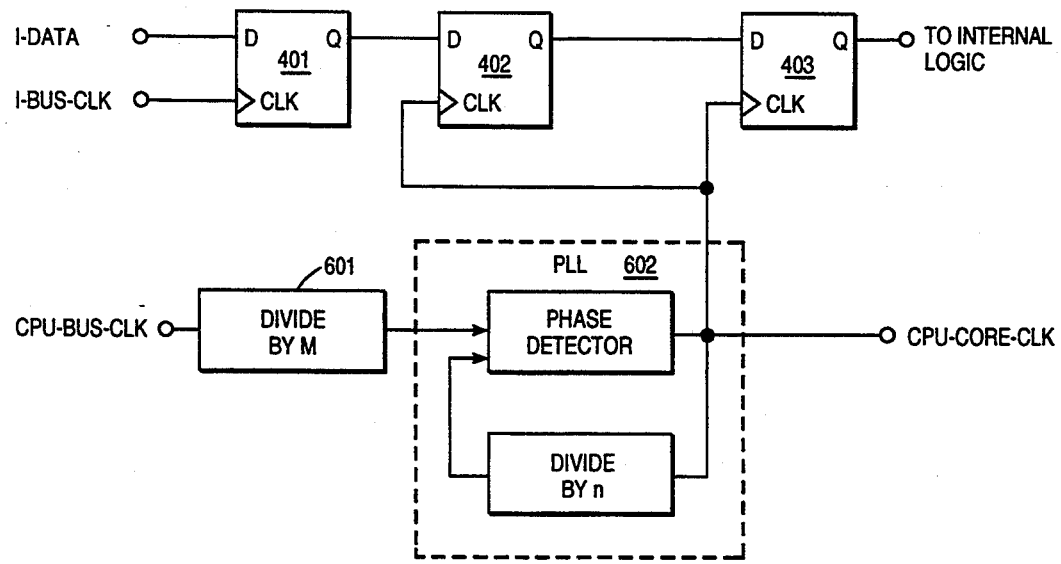
FIG_39
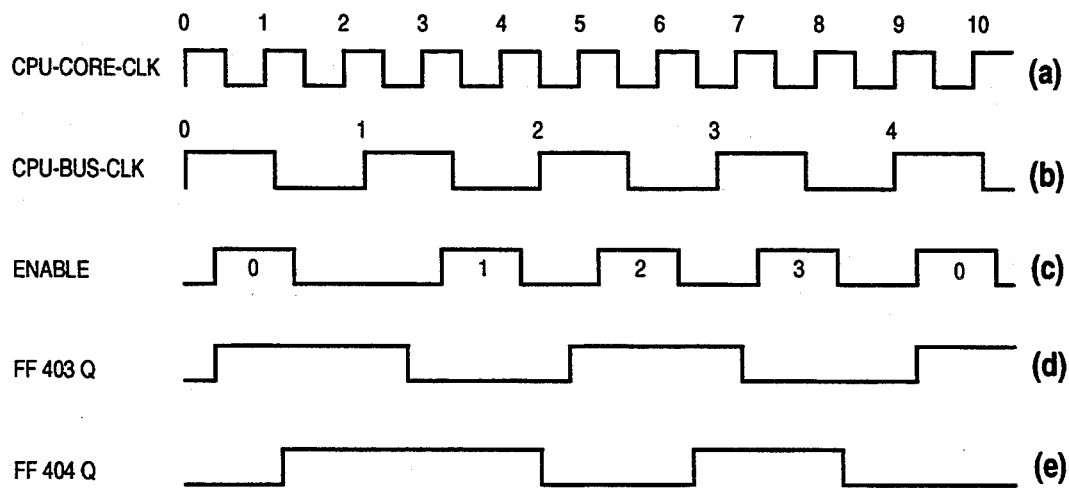
FIG_41

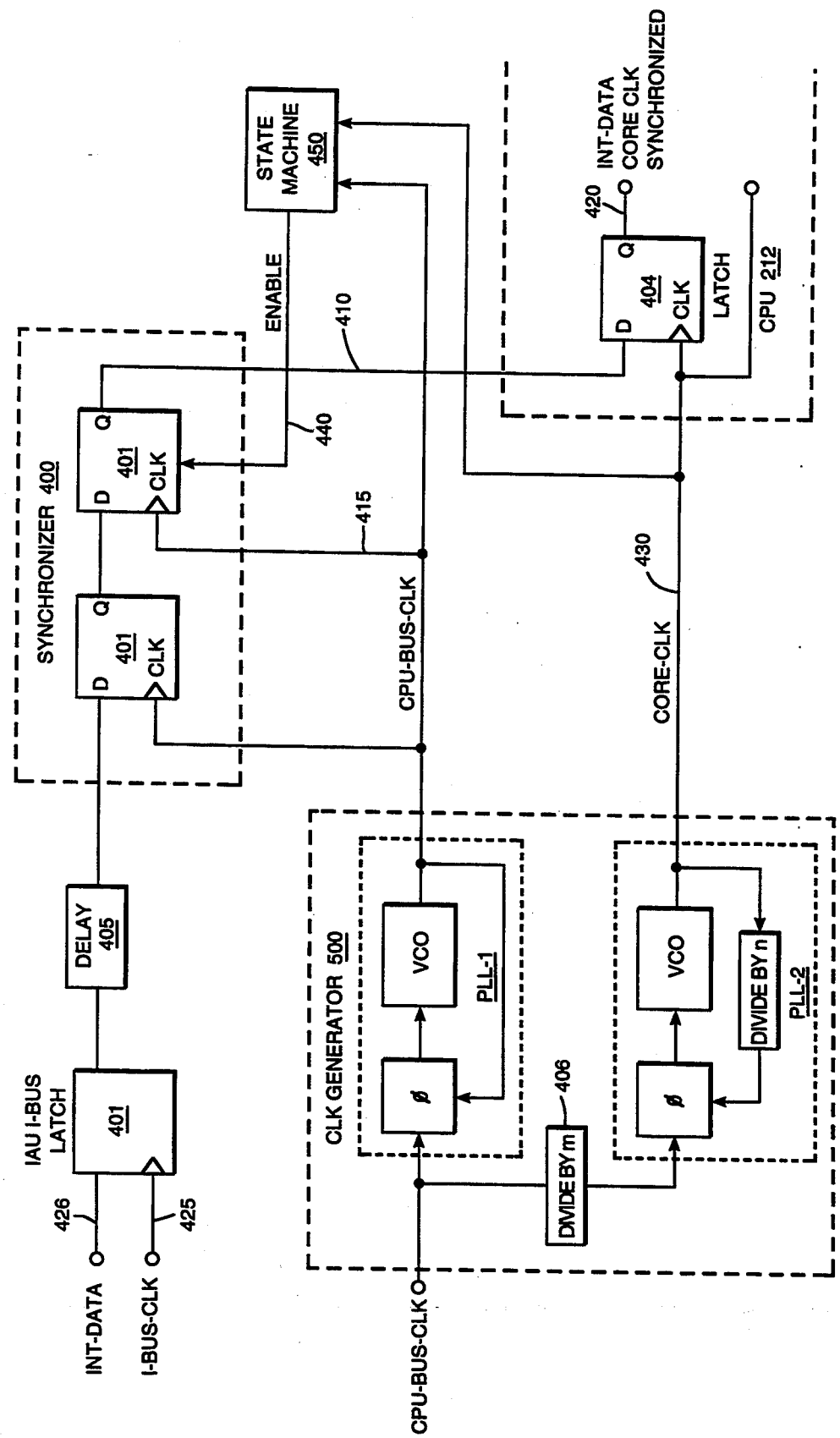
FIG._41

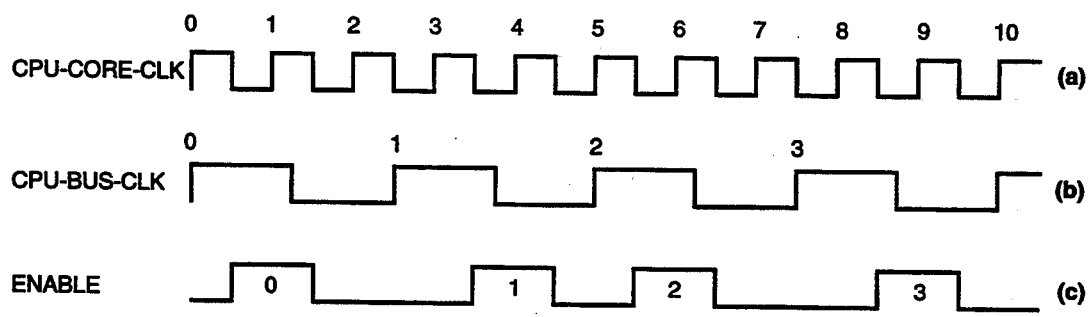
FIG_42
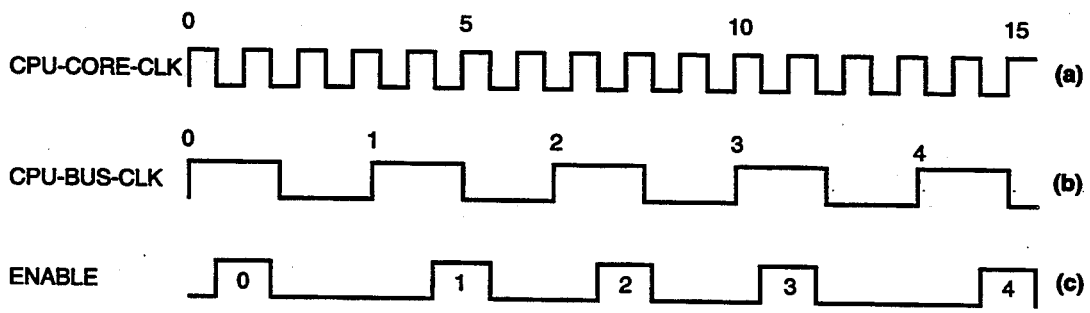
FIG_43

MULTIPROCESSOR PROGRAMMABLE INTERRUPT CONTROLLER SYSTEM ADAPTED TO FUNCTIONAL REDUNDANCY CHECKING PROCESSOR SYSTEMS

CROSS-REFERENCE TO RELATED APPLICATIONS

This application is a continuation-in-part of application Ser. No. 08/008,074, filed Jan. 22, 1993, now issued as U.S. Pat. No. 5,283,904, which is a continuation-in-part of application Ser. No. 07/632,149, filed Dec. 21, 1990, abandoned and related to cofiled applications for "A Multiprocessor Programming Interrupt Controller System With Processor-Integrated Interrupt Controllers", application Ser. No. 08/176,122, filed Dec. 30, 1993, and for "A Multiprocessor Programmable Interrupt Controller System with Separate Bus and Retry Management", application Ser. No. 08/175,776, filed Dec. 30, 1993. Title of all applications was owned by the same entity at the time of inventions.

FIELD OF THE INVENTION

This invention relates to the management of interrupt request messages in a multiprocessor system that incorporates at least one functional redundancy checking processor unit.

BACKGROUND OF THE INVENTION

Input/output peripheral equipment, including such computer items as printers, scanners, and display devices, require intermittent servicing by a host processor in order to ensure proper functioning. Services, for example, may include data delivery, data capture, and/or control signals. Each peripheral will typically have a different servicing schedule that is not only dependent on the type of device but also on its programmed usage. The host processor is required to multiplex its servicing activity amongst these devices in accordance with their individual needs while running one or more background programs. Two methods for advising the host of a service need have been used: polled device and device interrupt methods. In the former method, each peripheral device is periodically checked to see if a flag has been set indicating a service request, while, in the latter method, the device service request is routed to an interrupt controller that can interrupt the host, forcing a branch from its current program to a special interrupt service routine. The interrupt method is advantageous because the host does not have to devote unnecessary clock cycles for polling. It is this latter method that the present invention addresses. The specific problem addressed by the current invention is the management of interrupts in a multiprocessor system environment that includes at least one functional redundancy checking (FRC) unit.

FRC units present a unique synchronization problem because each FRC unit has two processor (CPUs): a master CPU and a checker CPU. The checker CPU tracks the master CPU following the same program instruction and receiving the same data. The checker CPU does not drive data on any system bus but monitors what the master CPU drives and compares what is driven with what it would have driven had it been the master CPU. Any discrepancy creates a system error. Because interrupts are asynchronous to the CPU clocks, there is the possibility that the master and checker CPUs recognize an interrupt in different clock cycles and consequently, but erroneously, declare a system error.

In the case of a computer network servicing a number of users, it would be highly desirable to distribute the interrupt handling load in some optimum fashion. Processors that are processing high priority jobs should be relieved of this obligation when processors with lower priority jobs are available. Processors operating at the lowest priority should be uniformly burdened by the interrupt servicing requests. Also, special circumstances may require that a particular I/O device be serviced exclusively by a preselected (or focus) processor. Thus, the current invention addresses the problem of optimum dynamic and static interrupt servicing in multiprocessor systems.

Prior art, exemplified by Intel's 82C59A and 82380 programmable interrupt controllers (PICs), are designed to accept a number of external interrupt request inputs. The essential structure of such controllers, shown in FIG. 1, consists of six major blocks:

IRR: Interrupt Request Register 11 stores all interrupt levels (IRQx) on lines 16 requesting service;

ISR: Interrupt Service Register 12 stores all interrupt levels which are being serviced, status being updated upon receipt of an end-of-interrupt (EOI);

IMR: Interrupt Mask Register 13 stores the bits indicating which IRQ lines 16 are to be masked or disabled by operating on IRR11;

VR: Vector Registers 19, a set of registers, one for each IRQ line 16, stores the preprogrammed interrupt vector number supplied to the host processor on data bus 17, containing all the necessary information for the host to service the request;

PR: Priority Resolver 15, a logic block that determines the priority of the bits set in IRR11, the highest priority is selected and strobed into the corresponding bit of ISR12 during an interrupt acknowledge cycle (INTA) from the host processor, Control Logic: Coordinates the overall operations of the other internal blocks within the same PIC, activates the host input internapt (INT) line 19 when one or more bits of IRR11 are active, enables VR19 to drive the interrupt vector onto data bus 17 during an INTA cycle, and inhibits all interrupts with priority equal or lower than that being currently serviced.

Several different methods have been used to assign priority to the various IRQ lines 16, including:
1) fully nested mode,
2) automatic rotation—equal priority devices, made and
3) specific rotation—specific priority mode.

The fully nested mode, supports a multilevel interrupt structure in which all of the IRQ input lines 16 are arranged from highest to lowest priority: typically IRQ0 is assigned the highest priority, while IRQ7 is the lowest.

Automatic rotation of priorities when the interrupting devices are of equal priority is accomplished by rotating (circular shifting) the assigned priorities so that the most recently served IRQ line is assigned the lowest priority. In this way, accessibility to interrupt service tends to be statistically leveled for each of the competing devices.

The specific rotation method gives the user versatility by allowing the user to select which IRQ line is to receive the lowest priority, all other IRQ lines are then assigned sequentially (circularly) higher priorities.

From the foregoing description, it may be seen that PIC structures of the type described accommodate uniprocessor systems with multiple peripheral devices but do not accommodate multiprocessor systems with multiple shared peripheral devices to which the present invention is addressed.

SUMMARY OF THE INVENTION

It is the object of the current invention to provide a multiprocessor programmable interrupt controller (MPIC) system including, but not limited to, the following capabilities:

1) a means for properly synchronizing interrupt requests to FRC units;
2) a separate Interrupt Bus, distinct from the memory (or system) bus, for communication of interrupt request (IRQ) and IRQ receipt acknowledgment signals, and for IRQ service arbitration between eligible servers;
3) interrupt servicing of multiple I/O peripheral subsystems, each with its own set of interrupt lines;
4) static as well as dynamic multiprocessor interrupt management;
5) programmable interrupt vector and steering information for each IRQ pin;
6) interprocessor interrupts allowing any processor to interrupt any other for dynamic reallocation of interrupt tasks;
7) operating system defined programmable reallocation of interrupt tasks; and
8) support of system-wide functions related to non-maskable interrupt (NMIs), processor reset, and system debugging.

The present invention achieves these capabilities by means of a MPIC system structure that includes three major subsystem components:

1) an Interrupt Bus, separate and distinct from the memory (system) bus;
2) an I/O Interrupt Delivery Unit (IDU) connected to the Interrupt Bus and to a set of IRQ pins, having a Redirection Table for processor selection and interrupt priority and vector information; and
3) a processor associated Interrupt Acceptance Unit (IAU) connected to the Interrupt Bus for managing interrupt requests for a specific system processor including acceptance acknowledgment, IRQ pending, nesting and masking operations, and interprocessor interrupt management.

More specifically, the present invention uses a three-wire synchronous bus, two wires for data, one wire for the clock, and one of the two data wires for bus and lowest priority arbitration.

BRIEF DESCRIPTION OF THE DRAWINGS

The present invention may be understood more fully from the detailed description given below and from the accompanying drawings of the preferred embodiments of the invention which, however, should not be taken to limit the invention to the specific embodiment but are for explanation and understanding only.

FIG. 1 depicts a block diagram of a common prior art uniprocessor programmable interrupt controller.

FIG. 2 is a block diagram of the preferred Multiprocessor Programmable Interrupt Controller (MPIC) system.

FIG. 3 shows the architecture of an Interrupt Delivery Unit (IDU).

FIG. 4 shows the I/O Select Register bit assignment.

FIG. 5 shows the I/O ID Register bit assignment.

FIG. 6 shows the I/O Version Register bit assignment.

FIG. 7 shows the Redirection Table Entry bit assignment layout.

FIG. 8 shows the architecture of an Interrupt Acceptance Unit (IAU).

FIG. 9 shows the IAU ID Register bit assignment.

FIG. 10 shows the IAU Destination Format Register bit assignment.

FIG. 11 shows the IAU Logical Destination Register bit assignment.

FIG. 12 shows the IAU Logical Vector Table bit assignment layout.

FIG. 13 shows the IAU Interrupt Command Register bit assignment layout.

FIG. 14 shows the IRR, ISR, and TMR bit assignment.

FIG. 15 is a flow diagram of the IAU interrupt acceptance process.

FIG. 16 shows the IAU Task Priority Register bit assignment.

FIG. 17 shows the IAU Spurious Interrupt Vector Register bit assignment.

FIG. 18 shows the IAU End-of-Interrupt register bit assignment.

FIG. 19 shows the IAU Remote Register.

FIG. 20 shows the IAU Version Register bit assignment.

FIG. 21 shows the EOI priority message format for level-triggered interrupts.

FIG. 22 shows the short message format.

FIG. 23 shows the IAU Interrupt Bus Status cycles decoding.

FIG. 24 shows the lowest priority without focus processor message format.

FIG. 25 shows the Remote Read message format.

FIG. 26 shows the IAU Error Status Register bit assignment.

FIG. 27 shows the Divide Configuration Register bit assignment.

FIG. 28 shows the IAU Times Vector Table format.

FIG. 29 is a block diagram of an IAU I-BUS-CLK to CPU-BUS-CLK synchronizer.

FIG. 30 shows the FRC synchronizer waveforms of master and checker CPUs.

FIG. 31 shows a an MPIC system that includes FRC unit and the means for synchronizing an interrupt to the FRC unit.

FIG. 32 shows the relationship between an FRC CPU clock signal and the interrupt bus clock signal.

FIG. 33 shows a clock generator suitable for an MPIC system with multiple FRC units operating at different clock rates.

FIG. 34 shows an alternative FRC implementation in an MPIC system.

FIG. 35 shows synchronizing apparatus when CPU-BUS-CLK and I-BUS-CLK are not harmonically related.

FIG. 36 shows waveforms resulting when CPU-BUS-CLK and I-BUS-CLK are not harmonically related.

FIG. 37 shows an external clock generator circuit.

FIG. 38 is a phase-locked-loop for generating a CPU-CORE-CLK that is a harmonic of CPU-BUS-CLK.

FIG. 39 shows an FRC synchronizer wherein the CPU-BUS-CLK and CPU-CORE-CLK rates are related by a proper fraction N/M.

FIG. 40 shows a two-stage synchronizing apparatus with CPU-BUS CLK signal conditioning and CPU-CORE-CLK derived from CPU-BUS CLK.

FIG. 41 is an example of waveforms in a two-stage synchronizer when CPU-CORE-CLK and CPU-BUS-CLK rates are ,related by a proper fraction.

FIG. 42 is another example of two-stage synchronizer waveforms when the CPU-BUS-CLK and CPU-CORE-CLOCK rates are related by a proper fraction.

FIG. 43 is still another example of two-stage synchronizer waveforms when the CPU-BUS-CLK and CPU-CORE-CLK rates are related by a proper fraction.

DESCRIPTION OF THE PREFERRED EMBODIMENT(S)

A Multiprocessor Programmable Interrupt Controller (MPIC) is described. In the following description, numerous specific details are set forth, in order to provide a thorough understanding of the preferred embodiment of the present invention. However, it will be apparent to one skilled in the art that the present invention may be practiced without these specific details. Also, well-known circuits have not been shown in detail, or have been shown in block diagram form, in order to avoid unnecessarily obscuring the present invention.

Additionally, in describing the present invention, reference is made to signal names peculiar to the currently preferred embodiment. Reference to these specific names should not be construed as a limitation on the spirit or scope of the present invention.

A. Overview of the Architecture

The Multiprocessor Programmable Interrupt Controller (MPIC) system is designed to accommodate interrupt servicing in a multiprocessor environment. Current practice is mainly concerned with uniprocessor systems in which the interrupt of a number of peripheral units are serviced by a single processor aided by a programmable interrupt controller (PIC). In a multiprocessor, it is often desirable to share the burden of interrupt servicing among the group of similar processes. This implies the ability to broadcast interrupt service requests to the pertinent group of processes and a mechanism for determining the equitable assignment of the tasks amongst the processors. The uniprocessor design problem is significantly simpler: the PIC dedicated to the processor assigns a priority to each interrupt request (IRQ) line, orders the request according to the assigned priorities and delivers the necessary information to the processor to timely initiate the appropriate servicing subroutine.

The MPIC system provides both static and dynamic interrupt task assignment to the various processors. When operating in a purely static mode, it functions much as a PIC in a uniprocessor system assigning each interrupt according to a prescribed schedule.

When operating in a dynamic mode, the MPIC manages interrupt task assignments by taking into consideration the relative task priority between the processors.

It is expected that more typical usage would entail elements of both static and dynamic interrupt management. Static assignment might be made, for example, when licensing considerations preclude the shared use of servicing software. Under other circumstances, it may be desirable to restrict the interrupt servicing task to a subset of processors that share a common peripheral subsystem. In the extreme case, all processors are subject to interrupt requests from all peripheral subsystems.

FIG. 2 is a block diagram of the preferred MPIC system 100. It consists of four major parts: a Memory (or System) Bus 110; an Interrupt Bus 115 which is distinct from Memory Bus 110; a multiplicity of processor units (CPUs) 112 interfaced to Memory Bus 110 by Memory Bus Interface (MBI/F) 117 and to Interrupt Bus 115 by Interrupt Acceptance Units (IAUs) 114; and at least one I/O Subsystem 116 interfaced to Memory Bus 110 by Memory Bus Interface (MBI/F) 118 and to Interrupt Bus 115 by Interrupt Delivery Unit (IDU) 113.

I/O subsystem 116 may be a single device with multiple interrupt request (IRQ) lines connecting to IDU 113 or a collection of devices, each with one or more IRQ lines 119. In the preferred embodiment, each IDU 113 may accommodate up to 16 IRQ input lines. Consequently, MBI/F 118 may be a single or multiple interface unit for coupling I/O Subsystems 116 to Memory Bus 110.

In the preferred embodiment, IAU 114 is resident on the CPU 112 chip for more efficient signal coupling. Also, MBI/F 117 may be unnecessary if the CPU Bus 120 protocol is compatible with that of Memory Bus 110.

It is important to recognize that the architecture of FIG. 2 provides Interrupt Bus 115 for routing of interrupt-related control messages between system elements, thus reducing the traffic that must be carried by Memory Bus 110. Memory Bus 110 is only used for the actual servicing of the IRQ and is not required for IRQ arbitration, assignment, and acceptance acknowledgment.

Each IDU accepts up to 16 IRQs on input lines 119 and broadcasts to all IAUs 114 over Interrupt Bus 115 an appropriately formatted IRQ message for each active IRQ input line. The IRQ message contains all necessary information for identifying the IRQ source and its priority.

Each IAU 114 examines the broadcast message and decides whether to accept it. If the IRQ message is tentatively accepted by more than one EAU, and arbitration procedure is invoked between competing units. The EAU with the lowest priority wins the arbitration and accepts the IRQ, pending delivery to its associated CPU. Also, IAU 114 provides nesting and masking of interrupts and handles all interactions with its local processor including the CPU protocol for interrupt request (INTR), interrupt acknowledge (INTA), and end of interrupt (EOI).

IAU 114 not only accepts IRQs broadcast on Interrupt Bus 114 but can generate interprocessor interrupts. It further provides a timer to its associated CPU.

B. Interrupt Control

The interrupt control function of all IDUs 113 and IAUs 114 is collectively responsible for delivering interrupts from interrupt sources to interrupt destinations in the multiprocessor system. An interrupt is an event that indicates that a certain condition somewhere in the system requires the attention of one or more processors in order to deal with this condition. The action taken by a processor in response to an interrupt is referred to as servicing the interrupt or handling the interrupt.

Each interrupt in the system has an identity that distinguishes the interrupt from other interrupts in the system. This identity is commonly referred to as the vector of the interrupt. The vector allows the processor to find the right handler for the interrupt. When a processor accepts an interrupt, it uses the vector to locate the entry point of the handler in its interrupt table. The architecture supports 240 distinct vectors with values in the range 16 to 255.

Each interrupt has an interrupt priority that determines the timeliness with which the interrupt should be serviced relative to the other activities of the processors. The architecture allows for 16 possible interrupt priorities: zero being the lowest priority and 15 being the highest. A value of 15 in Task Priority Register (TPR) will mask off all interrupts which require interrupt vectors. Priority of interrupt A "is higher than" the priority of interrupt B if servicing A is more urgent than servicing B. An interrupt's priority is implied by its vector; namely, priority=Vector/16.

Sixteen different interrupt vectors can share a single interrupt priority.

Because each IAU 114 can only keep pending two interrupts in a given priority class, it is preferred that the number of interrupts in a class be limited to two when only a single CPU is operating. However, for a multiprocessor processor operation with a number, N, of CPUs functioning, the preferred number of pended interrupts per class is N/2.

Typically, a priority model would organize the interrupt priorities from high (15) to low (0) as follows:

| Priority | Type of Interrupt | |
|---|---|---|
| | Class 1 | Class 2 |
| 15 | System Event | System Event |
| 14 | Interprocessor | Interprocessor |
| 13 | Local CPU | Local CPU |
| 12 | Timer | Timer |
| 11-2 | I/O | I/O |
| 1 | Application Procedure Call | Delayed Procedure Call |
| 0 | Reserved | Reserved |

Thus, system events requiring urgent attention, such as power failure, etc.) have the highest priority, followed by interprocessor (CPU) interrupts, local CPU related interrupts, IAU timer interrupts, I/O interrupts, and procedure call related interrupts. In this example, priority 0 is not used.

IRQs are generated by a number of sources within the multiprocessor system including: external (I/O) devices, local (to CPU) devices, IAU 114 timers, and CPUs. IRQs from I/O or devices local to a CPU may activate their Interrupt Lines 119 by using either signal edge transitions or signal levels. IAU timers generate an on-chip internal interrupt. A CPU may interrupt another CPU or sets of CPUs in support of software self-interrupts, preemptive scheduling, Table Look-aside Buffer (TLB) flushing, and interrupt forwarding. A processor generates interrupts by writing to the Interrupt Command Register (ICR) in its local IAU.

C. IDU Structure

IDU 113, shown in FIG. 3, consists of a set of IRQ pins for accepting I/O Interrupt Lines 119, an Interrupt Redirection Table 201, and a Message Unit 202 for sending and receiving interrupt control related messages from Interrupt Bus 115. The Redirection Table has a Destination (DEST), mode, and vector entry for each of the 16 I/O interrupt lines. Activating an Interrupt Line selects the corresponding table entry and delivers it to Send/Receive Unit 202 for formatting an appropriate IRQ message for broadcast on Interrupt Bus 115. The contents of Redirection Table 201 is under software control. Each table entry register is 64 bits wide. All registers are accessed using 32-bit reads and stores. Each IDU 113 is located at a unique address.

In addition, each IDU 113 has five 32-bit I/O Registers (203-207).

Select Register 204 selects which I/O register's contents is to appear in Window Register 203 by a software write to the lower 8 bits (bits 0-7), as shown in FIG. 4. This permits software manipulation of the contents of the other four I/O Registers.

Window Register 203 is mapped onto the register selected by Select Register 204.

ID Register 205 contains the IDU 4-bit identification code which serves as the physical name of the IDU. Each IDU is assigned a unique name (ID). The bit assignment is shown in FIG. 5. At power-up, it is reset to zero. Its contents must be supplied by software before use.

Arbitration Register 206 contains the bus arbitration priority for the IDU. Its initial contents are derived from the ID in ID Register 205. A rotating priority scheme is used for Interrupt Bus arbitration wherein the winner of the arbitration becomes the lowest priority agent and assumes an arbitration ID of zero. All other bus agents, except the agent whose arbitration ID is 15, increment their ID by one. The agent with ID=15 takes the winner's ID and increments it by one. Arbitration IDs are adjusted only for messages that are transmitted successfully. "Transmitted successfully" means no CS error or acceptance error was reported for that message. Arbitration Register 206 is loaded with contents of ID Register 205 during a level-triggered INIT with deassert message.

Version Register 207 identifies implementation versions of the IDU. The register bit map of FIG. 6 shows that bits 0-7 are assigned to the version number and are hardwired, read-only. Bits 16-23 represent the maximum assigned vector index value, $n_{max}$, of redirection table 201. Each IDU can accept up to 16 interrupt lines, and each MPIC system can accommodate 240 interrupt vectors ($0 \leq n \leq 239$) so that, for a full capacity system with 15 IDUs, $n_{max}=15, 31, 47, 63, \ldots, 224, 239$ with one $n_{max}$ assigned to each IDU's Version Register 207.

The Redirection Table 201 has a dedicated entry for each interrupt input pin. The notion of interrupt priority is completely unrelated to the position of the physical interrupt input pin on the IDU. Instead, software can decide for each pin individually what it wants the vector (and therefore the priority) of the corresponding interrupt to be. For each individual pin, the operating system can also specify the signal polarity (low active or high active), whether the interrupt is signaled as edges or levels, as well as the destination and delivery mode of the interrupt. The information in the Redirection Table is used to translate the interrupt manifestation on the corresponding interrupt pin into a MPIC system message.

In order for a signal on edge-sensitive Interrupt Input Lines 119 to be recognized as a valid edge (and not a glitch), the input level on the pin must remain asserted until IDU 113 broadcasts the corresponding message over the Interrupt Bus and the message has been accepted by the destination(s) specified in the destination field. Only then will the source IDU be able to recognize a new edge on that interrupt input pin. That new edge will only result in a new invocation of the handler if its acceptance by the destination IAU causes an Interrupt Request Register (IRR) bit to go from zero to 1. (In other words, if the interrupt wasn't already pending at the destination.)

The minimum number of entries in the Redirection Table in the IDU implementation should be 16. The I/O Version Register contains the number of entries in that IDU's redirection table. The layout of an entry in the Redirection Table 201 is as shown in FIG. 7.

Each Redirection Table entry is a 64-bit string defined as follows:

VECTOR[0:7]: The Vector field is an 8-bit field containing the interrupt vector for this interrupt. Vector values range between 10 and FE (hex).

DELIVERY MODE[8:10]: The Delivery Mode is a 3-bit field that specifies how the IAUs listed in the destination field should act upon reception of this signal. Note that certain Delivery Modes will only operate as intended when used in conjunction with a specific Trigger Mode. These restrictions are indicated in the table below for each Delivery Mode.

000 (Fixed): means deliver the signal to the INTR (maskable interrupt) input of all processor cores listed in the destination. Trigger Mode for "fixed" Delivery Mode can be edge or level.

001 (Lowest Priority): means deliver the signal to the INTR input of the processor core that is executing at the lowest priority among all the processors listed in the specified destination. Trigger Mode for "lowest priority" Delivery Mode can be edge or level.

010 (SMI): means System Management Interrupt. A delivery mode equal to "SMI" requires an "edge" Trigger Mode. The Vector information is ignored but should be programmed to all zeroes.

100 (NMI): means deliver the signal to the NMI (non-maskable interrupt) input of all processor cores listed in the destination, vector information is ignored. "NMI" is treated as an "edge" triggered interrupt even if it is programmed as a "level" triggered interrupt.

101 (INIT): means deliver the signal to all processor cores listed in the destination by asserting the INIT signal. All addressed IAUs will assume their INIT state. INIT is always treated as an "edge" triggered interrupt even if programmed otherwise.

111 (ExtINT): means deliver the signal to the INTR input of all processor cores listed in the destination as an interrupt that originated in an externally connected (Intel 8259A-compatible) interrupt controller. The Interrupt Acknowledgment (INTA) cycle that corresponds to this ExtINT delivery will be routed to the external controller that is expected to supply the vector. A Delivery Mode of "ExtINT" requires an "edge" Trigger Mode.

DESTINATI/ON MODE[11]: This field determines the interpretation of the Destination field as follows:
  0 (Physical Mode): in Physical Mode, a destination IAU is identified by its ID. Bits 56–59 of the Destination field specify the 4-bit IAU.
  1 (Logical Mode): in Logical Mode, destinations are identified by matching on Logical Destination under the control of the Destination Format Register and Logical Destination Register in each IAU. Bits 56–63 (8 MSB) of the Destination field specify the 8-bit IAU ID.

DELIVERY STATUS[12]: Delivery Status is a 1-bit field that contains the current status of the delivery of this interrupt. Two states are defined:
  0 (Idle): means that there is currently no activity for this interrupt; and
  1 (Send Pending): indicates that the interrupt has been injected, but its delivery is temporarily held up due to the Interrupt Bus being busy, or the inability of the receiving IAU to accept that interrupt at that time.

Delivery Status is software read-only; software writes to this field (as part of a 32-bit word) do not affect this bit.

INTERRUPT INPUT PIN POLARITY[13]: This bit specifies the polarity of each interrupt signal connected to the interrupt pins of the IDU. A value of zero means the signal is high, and a value of 1 means the signal is low active.

REMOTE IRR[14]: This bit is used for level-triggered interrupts; its meaning is undefined for edge-triggered interrupts. For level-triggered interrupts, this bit is set when IAUs accept the level interrupt sent by the IDU. Remote IRR bit is reset when an interrupt input line level is inactive or an End-of-Interrupt (EOI) message is received from an IAU.

TRIGGER MODE[15]: The Trigger Mode field indicates the type of signal on the interrupt pin that triggers an interrupt. Zero indicates edge-sensitive, and 1 indicates level-sensitive.

MASK[16]: Use this bit to mask injection of this interrupt. Zero indicates that injection of this interrupt is not masked. An edge or level on an interrupt pin that is not masked results in the delivery of the interrupt to the destination. One (1) indicates that injection of this interrupt is masked. Edge-sensitive interrupts signaled on a masked interrupt input pin are simply ignored (i.e., it is not delivered and is not held pending). Level-asserts or deasserts occurring on a masked level-sensitive pin are also ignored and have no side effects. Changing the mask bit from unmasked to masked after the interrupt was accepted by an IAU has no effect on that interrupt. This behavior will be identical to the case in which the interrupting device withdraws the interrupt before that interrupt is posted to the processor. It is the software's responsibility to deal with the case where the Mask bit is set after the interrupt message has been accepted by an IAU but before the interrupt is dispensed to the processor.

BUFFER FLUSH ENABLE[17]: This bit controls the flushing of I/O Registers on a per-interrupt basis. When this bit is set to zero, the I/O Register must be flushed before the I/O interrupt is sent to the IAUs. When this bit is set to one, the flushing of I/O Register is not required before sending the I/O interrupt to the IAUs.

DESTINATION[56:63]: If the Destination Mode of this entry is "Physical Mode," then bits 56–59 contain an IAU ID. If Logical Mode, then the Destination field potentially defines a set of processors. Bits 56–63 of the Destination field specify the logical destination address.

D. IAU Structure

The IAU is responsible for the local processor interrupt sources, interrupt acceptance, dispensing interrupts to the processor, and sending interprocessor interrupts. Depending on the Delivery Mode of the interrupt, none, some, or all IAUs can accept an interrupt. An IAU accepts an interrupt only if it will deliver the interrupt to its processor. Accepting an interrupt is purely an inter-MPIC matter;, dispensing an interrupt to the local processor only involves an IAU and its associated processor. FIG. 8 is a block diagram of an IAU.

Software interacts with the IAU by reading and writing its registers. The intent is that the register set of each IAU appear at an identical address for each processor. Software can then use an identical address to control interrupts independently of which processor, in the multiprocessor system, is currently running the code.

The address space (memory space) for the IAU is fixed at FEE0 0000 (hex) for 32-bit address and reserves 4 k bytes of memory. Typically, software would access IDUs very infrequently, while access to the IAUs is performance-critical. Locating the local unit in memory space yields best performance since software writes to the IAU registers can be posted at the processor. Note that write posting works as long as the INTA (interrupt acknowledge) cycle forces a flush of all buffered writes by the processor doing the INTA.

All registers are accessed by unique addresses and by using 32-bit loads and stores. This implies that, to modify a field (e.g., bit, byte ) in any register, the whole 32-bit register must be read, the field modified, and the 32 bits written back. Also, registers that are described as 64 or 256 bits wide are accessed as multiple independent 32-bit registers.

Register description fields containing r's or <RESERVED> or <reserved> are reserved by the architecture. Reserved fields will read as all zeroes.

The destination of an interrupt can be zero, one, all, or a group of processors in the system. A different destination can be specified for each interrupt. The sender specifies destination of an interrupt in one of two Destination Modes:

Physical Mode and Logical Mode.

In Physical Mode, the destination processor is specified by a unique 4-bit ID. Only a single destination or a broadcast to all (ID of all ones) can be specified in this mode.

Each IDU and IAU has a register that contains the unit's ID. The ID serves as a physical name of the MPIC unit. The ID is loaded at power-up. It can be read by software at all times without any side effects.

In the Physical Mode, the ID is used to specify destination information. In the preferred embodiment, a maximum of 15 IAUs are supported. An ID of all 1s denotes a broadcast to all IAUs. FIG. 9 shows the bit assignments of the IAU ID register 301.

In the Logical Mode, destinations are specified using an 8-bit Logical Destination Field. All IAUs contain an 8-bit field in Logical Destination Register (LDR) 302 against which the Destination Field of interrupt is matched to determine if the receiver is being targeted by the interrupt. An additional 8-bit Destination Format Register (DFR) 302 in each IAU defines exactly how the Destination Field is compared against the LDR. In other words, DFR 302 defines the interpretation of the Logical Mode destination information. The 4 bits (bits 24 to 27) of the Destination Format Register is always fixed with 1s. FIGS. 10 and 11 show the bits assignment for DFR 302 and LDR 303.

DFR 302 and LDR 303 can be programmed to achieve a Flat Model interrupt delivery mode of the cluster-based delivery mode.

For the Flat Model, bits 28–31 of the DFR 302 must be programmed to 1s. Bits 0–27 of the DFR are always 1s.

Also, bits 24–31 of the destination information are interpreted as a decoded field. This field is compared against the LDR of the IAU. If there is a bit match (i.e., if at least one of the corresponding pair of bits of the Destination Field and LDR match), this IAU is selected for interrupt delivery. Each bit position in the Destination Field corresponds to an individual IAU this scheme allows the specification of arbitrary groups of IAUs simply by setting the member's bits to one, but only allows a maximum of eight IAUs in a system.

Broadcast to all is achieved by setting all 8 bits of destination to 1s. This selects all IAUs in the MPIC system.

For the Cluster Model, bits 28–31 of the FDR should be programmed to zeroes. In this model, there are two connection schemes: Flat Cluster and Hierarchical Cluster.

In the Flat Cluster Model, all clusters are connected on a single Interrupt Bus. Bits 28–31 of the Destination Field are the encoded address of the destination cluster which is compared against bits 28–31 of the LDR to determine if the IAU is part of the cluster. The lower four bits of the Destination Field and bits 24–27 of the LDR are compared to identify individual IAUs within the cluster. Arbitrary sets of processors within a cluster can be specified by naming the cluster and setting the bits in the LDR destination field (bits 24–27) for the selected members in the cluster. In this mode, 15 clusters each having four processors can be supported. But the arbitration ID supports only 15 agents on the Interrupt Bus, and hence the total number of processors supported in this mode is limited by the MPIC ID. Broadcast to all is achieved by setting all destination bits to 1. This guarantees a match on all clusters, and will select all IAUs in each cluster.

In the hierarchical Cluster Model, flat clusters are connected through hierarchical Interrupt Buses. Cluster managers handle the message passing between Interrupt Buses.

Each processor has a processor priority that reflects the relative importance of the code the processor is currently executing. This code can be part of a process or thread, or can be an interrupt handler. A processor's priority fluctuates as a processor switches threads, a thread or handler raises and lowers its priority level to mask out interrupt handlers, and the processor enters an interrupt handler and returns from an interrupt handler to a previously interrupted activity.

A processor is lowest priority within a given group of processors if its processor priority is the lowest of all processors in the group. Note that more than one processor can be lowest priority in a given group.

A processor is the focus of an interrupt if it is currently servicing that interrupt, or if it currently has a request pending for the interrupt. Focus processor checking can be enabled/disabled by programming the bit 9 of the Spurious Interrupt Vector Register.

Interrupt delivery begins with an interrupt source injecting its interrupt into the interrupt system at one of the IDUs. Delivery is complete only when the servicing processor tells its local IAU it is complete by issuing an end-of-interrupt (EOI) command to its local IAU. Only then has all relevant information regarding that occurrence of the interrupt been erased. The interrupt system guarantees exactly-once acceptance semantics of interrupts to the specified destinations.

Clearly, a single-edge interrupt or level interrupt counts as a single occurrence of an interrupt. In uniprocessor systems, an occurrence of an interrupt that is already pending cannot be distinguished from the previous occurrence. All occurrences are recorded in the same interrupt IRR bit. They are therefore treated as "the same" interrupt occurrence.

For lowest-priority delivery mode, the identical behavior can be achieved in a multiprocessor system by delivering an interrupt fast to its focus processor (if it currently has one). If an interrupt has a focus processor, then the interrupt will be delivered to the interrupt's focus processor independent of priority information.

Each edge occurring on an edge-triggered interrupt input pin is clearly a one-shot event; each occurrence of an edge is delivered. An active level on a level-triggered interrupt input pin represents more of a "continuous event." Repeatedly, broadcasting an interrupt message while the level is active would cause flooding of the Interrupt Bus and, in effect, transmits very little useful information since the same processor (the focus) would have to be the target.

Instead, for level-triggered interrupts, the IAUs recreate the state of the interrupt input pin at the destination IAU. The source IDU accomplishes this by tracking the state of the appropriate destination IAU's Interrupt Request Register (or pending bit) in register group 312. The destination IAU sends an inter-MPIC message to all IDUs to reset the remote IRR bit when the EOI for that level interrupt is serviced by the destination IAU. Then, the relevant IDU resets the remote Interrupt Request Register (IRR) bit of that level interrupt.

Because IAUs have storage in the IRR for pending only two interrupts per class, there is a possibility that the IAU cannot accept further interrupts in that same class. In this case, the IAU notifies the sender by means of the status cycle of the message to "retry" the same interrupt again later.

The IDU scans its interrupt lines sequentially (from top to bottom) in a circular fashion. When it sees an interrupt active and its delivery status bit is set (i.e., send pending), it will transmit that interrupt onto the Interrupt Bus. If that interrupt is not accepted by any IAU because its holding register is busy, or because of a check sum error, or a no response error, the IDU does not reset its delivery status bit to idle for that interrupt but goes to the next interrupt line and continues scanning. The IDU goes back to the interrupt which needs the "retry" only when its turn comes in the scan sequence.

The IPI (Interprocessor Interrupt) messages, which also use the Interrupt Bus, follow the same rules for message retrys.

Repeated message retrys on the Interrupt Bus result in a loss of useful bandwidth. Ideally, retrys can be minimized by using following techniques. Retrys resulting from nonacceptance of messages by the destination IAU because of nonavailability of holding buffer space can be minimized by the sending IDU's use of the Interrupt Bus transmission exponential backoff method. Retrys due to check sum error or acceptance error should be limited to one or two retry attempts before treating it as hard error. It is software's responsibility to intervene to stop the retrys caused by check sum and acceptance errors.

Remote Read messages are always accepted unless there is a check sum error. There is no retry for Remote Read message. NMI, SMI, INIT, and ExtINT interrupts are retried for check sum and acceptance errors. These interrupts are always accepted by the IAUs if there is no check sum or acceptance errors.

The MPIC supports two modes for selecting the destination processor: Fixed Priority and Lowest Priority. Fixed Priority is a static distribution mode, while Lowest Priority is a dynamic mode.

In Fixed Priority mode, the interrupt is unconditionally delivered to all IAUs that match on the destination information supplied with the interrupt. Note that for I/O device interrupts, typically only a single IAU would be listed in the destination. Priority and focus information are ignored. If the priority of a destination processor is higher than or equal to the priority of the interrupt, then the interrupt is held pending locally in the destination processor's local IAU. When the processor priority becomes low enough, the pending interrupt is dispensed to the processor by its local IAU.

Fixed Priority mode allows static distribution of the interrupt load across all processors. It also allows existing single-threaded device drivers to function in a multiprocessor system environment. It requires that software bind the driver to a fixed processor and set up the IDU to direct the device's interrupts to only that processor.

Under the Lowest Priority delivery method, the processor that will handle the interrupt is the one in the specified destination with the lowest processor priority value. If more than one processor is at the lowest priority, then the unique arbitration ID is used to break ties. For lowest priority dynamic delivery, the interrupt will always be taken by its focus processor if it has one. Only IAUs which have a free or available holding register for the priority class will participate in the lowest priority arbitration.

The Lowest Priority delivery method assures minimum interruption of high priority tasks. Because each IAU only knows its own associated processor priority, determining the lowest priority processor is done by arbitration on the Interrupt Bus.

All IDUs and IAUs communicate during interrupt delivery. Interrupt information is exchanged between different MPIC units on a dedicated three-wire Interrupt Bus in the form of broadcast messages. The format of these MPIC messages is not visible to software.

The 4-bit arbitration ID (Arb ID Register 307) is derived from the contents of ID Register 301. MPIC employs rotating priority scheme for bus arbitration. The Arb IDs are updated every time a message is transmitted successfully. Each IAU using a common Interrupt Bus should have a unique ID. The Arbitration ID is also used to resolve ties during lowest priority arbitration.

The Redirection Table of IDU 113 (FIG. 3) serves to steer interrupts that originate in the I/O subsystems to the processors. Local Vector Table 322 of FIG. 8 is its equivalent for interrupts that are restricted to the local processor. The Local Vector Table 322 contains four 32-bit entries: Timer, Local Interrupt 0, Local Interrupt 1, and Error Interrupt, as shown in FIG. 12.

The assigned bit fields of FIG. 12 are as follows:

VECTOR[0:7]: This is the vector bit field to use when generating an interrupt for this entry. The vector values range between 10 and FF(hex).

DELIVERY MODE[7:10]: This field only exists for the Local Interrupt entries 1 and 2, and has the same meaning as the Delivery Mode in Redirection Table 201 of the IDU shown in FIG. 3. The Timer entry generates edge-triggered maskable interrupts to the local processor. Delivery Mode field does not exists for Timer interrupt entry.

DELIVERY STATUS[12]: Delivery Status in Local Vector Table entries is identical to Delivery Status in the Redirection Table 201 (Idle, Send Pending). This field is software read-only.

INTERRUPT INPUT PIN POLARITY[13]: This bit specifies the polarity of each interrupt signal connected to the interrupt pins of the IAU. A value of zero means the signal is high active, and a value of 1 means the signal is low active.

REMOTE IRR[14]: This bit is used for level-triggered interrupts; its meaning is undefined for edge-triggered interrupts. For level-triggered interrupts, this bit is set when the acceptance logic of the IAU accepts the interrupt. Remote IRR bit is reset when the corresponding line level of Interrupt Input lines 119 of the IDU is inactive or an EOI message is received from the IAU.

TRIGGER MODE[15]: The Trigger Mode field indicates the type of signal on the local interrupt pin that triggers an interrupt: zero indicates edge-sensitive; 1 indicates level-sensitive. Only the local interrupt pins can be programmed as edge-or level-triggered. Timer interrupt is always treated as edge triggered.

MASK[16]: Zero enables injection of the interrupt; 1 masks injection of the interrupt.

TIMER MODE[17]: Zero indicates one-shot mode; one indicates periodic mode. (This field is only defined for the Timer entry.)

A processor generates interprocessor interrupts (IPIs) by writing to Interrupt Command Register (ICR) 305 in its local IAU. Conceptually, this can be thought of as the processor providing an interrupt Redirection Table Entry on the fly. Not surprisingly, the layout of Interrupt Command Register 305 resembles that of an entry in Redirection Table 201 of FIG. 3. Note that the format of this register allows a processor to generate an edge-triggered interrupt. A processor may use this to forward device interrupts originally accepted by it to other processors. This can also be a useful debug feature. All interprocessor interrupts are treated as edge-triggered even if programmed otherwise.

All fields of ICR 305 are read-write by software with the exception of the Delivery Status and Remote Read Status fields which are read-only. Writing a 32-bit word to an ICR that contains an interrupt vector causes the interrupt message to be sent.

The bit assignments for ICR 305 are shown in FIG. 13 and are described as follows:

VECTOR[0:7]: The vector ID identifying the interrupt being sent. If the Delivery Mode is "Remote Read," then the Vector field contains the address of the register to be read in the remote IAU.

DELIVERY MODE[8:10]: The Delivery Mode is a 3-bit field that specifies how the IAUs listed in the destination field should act upon reception of this signal. Note that all interprocessor interrupts behave as edge-triggered interrupts (except for a special case of INIT described later) even if they are programmed as level-wiggered interrupts.

- 000 (Fixed): means deliver the signal on the INTR signal of all processor cores listed in the destination. Always edge-triggered. Trigger Mode and level information are don't care.
- 001 (Lowest Priority): means deliver the signal on the INTR signal of the processor core that is executing at the lowest priority among all the processors listed in the specified destination. Always edge-triggered. Trigger Mode and level information are don't care.
- 010 (SMI): means System Management Interrupt. A delivery mode equal to "SMI" is treated as an "edge" triggered interrupt. The vector information is ignored. Trigger Mode and level information are don't care.
- 011 (Remote Read): is a request to a remote IAU to send the value of one of its registers over the Interrupt Bus. The register is selected by providing its address in the Vector field. The register value is latched by the sending IAU and stored in the Remote Register where it can be read by the local processor. A Delivery Mode of "Remote Read" requires an edge Trigger Mode.
- 100 (NMI): means deliver the signal to the NMI input of all processor cores listed in the destination, vector information is ignored. "NMI" is treated as an "edge" triggered interrupt even if it is programmed as a "level" triggered interrupt. Trigger Mode and level information are don't care.
- 101 (INIT): means deliver the signal to all processor cores listed in the destination by asserting the INIT signal. All addressed IAUs will assume their INIT state. INIT is always treated as an "edge" triggered interrupt even if programmed otherwise except for the following special case. When INIT is programmed with Trigger Mode="level" and Level Mode=0 (i.e., deassert), it will be interpreted as a synchronization message to all MPIC agents to synchronize their Arb IDs with their MPIC IDs. Hereafter, this message is referred to as "INIT Deassert." When INIT is programmed as an "edge" triggered interrupt, "Level" information is don't care.

DESTINATION MODE[11]: The interpretation of this field is identical to the Destination Mode field in Redirection Table 201.

DELIVERY STATUS[12]: A value of zero means there is no activity for this interrupt. A value of 1 means delivery of this interrupt is temporarily held up due to the Interrupt Bus being busy or the receiving IAU not having a free interrupt slot to accept the interrupt. If the message encounters a Checksum (CS) error or a no response error, the IAU will set the appropriate error bit in the error status register and will retry the message. Software determines the number of retry allowed before treating it as a hard error.

LEVEL[14]: This bit is used for the Special case of INIT delivery mode described above. For all other delivery modes, this bit is a don't care.

TRIGGER MODE[15]: This field is used for the Special case of INIT delivery mode described above. For all other delivery modes, this bit is a don't care.

REMOTE READ STATUS[16:17]: This field indicates the status of the data contained in the Remote Read register. This field is read-only to software. Whenever software writes to the Interrupt Command Register 305 using Delivery Mode "Remote Read," the Remote Read status becomes "in-progress" (waiting for the remote data to arrive). The remote MPIC agent is expected to respond in a fixed amount of Interrupt Bus cycles. If the remote agent is unable to do so, then the Remote Read status becomes "Invalid." If successful, the Remote Read status resolves to "Valid." Software should poll this field to determine completion and success of the Remote Read command. This 2-bit code has the following interpretation:

- 00 (invalid): the content of the Remote Read Register is invalid. This is the case after a Remote Read command issued and the remote agent was unable to deliver the Register content in time or the message had a check sum error.

01 (in progress): a Remote Read command has been issued, and this IAU is waiting for the data to arrive from the remote agent.

10 (valid): the most recent Remote Read, command has completed, and the remote register content in the Remote Read Register is valid.

DESTINATION SHORTHAND[18:19]: This field indicates whether a shorthand notation is used to specify the destination of the interrupt by the shorthand code used. Destination Shorthands do not use the 8-bit Destination field and can be sent by software with a single 32-bit write to the IAU Interrupt Command Register 305. The 2-bit code is interpreted as follows:

00 (dest-field): means that no shorthand is used. The destination is specified in the 32-bit Destination field in the second word (bits 32–63) of the Interrupt Command Register 305.

01 (self): means that the same IAU is the sole destination of the interrupt. This is useful for software interrupts. The Destination field in the Interrupt Command Register is ignored. In this mode, Lowest Priority and Remote Read delivery modes are not supported.

10 (all-incl-self): means that the interrupt is to be sent to "all" processors in the system including the processor sending the interrupt. The sending IAU broadcasts a message with destination field set to all ones. Global TLB (cache table look-aside buffer) flush and broadcasting timer interrupts are typical uses for this mode. In this mode, Lowest Priority and Remote Read delivery modes are not supported.

11 (all-excl-self): means that the interrupt is to be sent to "all" processors in the system with the exception of the processor sending the interrupt. The IAU broadcasts a message with the Physical Destination Mode field and ID field set to all 1s. All-excl-self is useful for selection of a boot processor (init) and also for TLB flush where "self" is flushed using the processor flush instruction.

DESTINATION[56:63]: This field is only used when the Destination Shorthand is set to "dest-field." If Destination Mode is Physical Mode, then the bits 56–59 contain an IAU ID. If Logical Mode, then the interpretation of the 8-bit Destination field further depends on the Destination Format Register 303 and LDR 302 in the IAUs.

All IAUs receive all messages broadcast over the Interrupt Bus. The IAU first checks if it is the message destination by matching the 8-bit Destination field in the message against its ID register (in the physical address mode) or LDR 302 under control of its Destination Format Register, in the logical address mode. All IAUs that match are said to "belong to the group."

Once an IAU determines it is a destination, it checks the availability of a slot in the Interrupt Request Register (IRR) for that particular interrupt (except for NMI, SMI, INIT, ExtINT). In the fixed delivery mode, if a slot is not available, the IAU will put "retry" status on the bus during the status cycle. If it can accept the interrupt, it waits until the status cycle to see any other agent has put "reject" or "retry" status on the bus. If there is no reject or retry status on the bus, the IAU accepts the interrupt.

In the lowest priority delivery mode, only IAUs which have interrupt slots available will participate in the lowest priority arbitration.

If a message is to be delivered for NMI, INIT, SMI, or ExtINT, then all IAUs listed in the destination unconditionally assert the corresponding output signal to the associated processor. ISR, IRR, etc. are bypassed for these types of interrupts, and vector information is not defined except for SMI. For SMI, vector field must be programmed to zero for future compatibility.

Because IAUs can accept interrupts from their local ICR and Interrupt Bus, there will be contention between these interrupts for the IAUs acceptance resources. In case of contention, the Interrupt Bus has the highest priority followed by the ICR and local interrupts.

Each IAU contains IRR, ISR, and TMR registers in register group 312 of FIG. 8, and formatted as shown in FIG. 14, that play a role in the acceptance of interrupts and in dispensing the accepted interrupts to the local processor. The Interrupt Request Register (IRR) contains the interrupts accepted by the IAU (up to two deep) but not yet dispensed to the associated processor. The In Service Register (ISR) contains the interrupts that are currently in service by the processor, i.e., the interrupts that have been dispensed to the processor but for which the processor has not yet signaled the End-of-Interrupt (EOI).

Each interrupt has an associated vector that determines the priority of the interrupt. When an interrupt is being serviced, all equal or lower priority interrupts are automatically masked by the IAU.

The Trigger Mode Register (TMR) indicates whether an interrupt is edge or level. This information is transmitted with each MPIC interrupt request message and reflects the Trigger Mode bit in the interrupt's Redirection Table 201 entry. The IRR bit is cleared at the same time ISR bit is set during the INTA cycle. If the TMR bit value is 1, then the local IAU will send a deassert message to all IDUs when the EOI cycle for that interrupt occurs.

ISR, IRR, and TMR registers are read-only by software. Each of these 256-bit registers is accessed as eight separate 32-bit registers. The processor masks interrupts by writing to the local IAU's Task Priority Register (described below).

Each of these registers (IRR, ISR, TMR) is seen by software as a bit array of 256 bits where bit "i" tracks the interrupt with vector "i." These registers are software only and bits 0–15 are reserved.

TMR (Trigger Mode Register): Upon acceptance of an interrupt, the TMR bit is cleared (zero) for edge-triggered interrupts and set (1) for level triggered interrupts. If TMR bit value is zero, nothing happens. IF TMR bit value is 1, then the local IAU sends an EOI message to all IDUs during the EOI cycle of that interrupt.

IRR (Interrupt Request Register): It contains the active interrupt requests that have been accepted, but not yet dispensed by this IAU. A bit in IRR is set when the IAU accepts the interrupt and is cleared when the INTA cycle occurs.

ISR (In Service Register): It marks the interrupts that have been delivered to the processor, but that have not been fully serviced (End-of-Interrupt not yet received). The ISR register reflects the current state of the processor's interrupt stack. ISR bit for the highest priority IRR is set during the INTA cycle. During the EOI cycle, the highest priority ISR bit is cleared and, if the corresponding TMR bit was set, an EOI message will be sent to all IDUs.

In addition to the IRR, ISR, and TMR registers, there are Holding Registers 311 for each priority level. These registers are used to temporarily store the interrupt and trigger level information before it is passed onto IRR and TMR registers, respectively. The registers are software transparent.

FIG. 15 is a flow diagram of the interrupt acceptance process of the IAU. The process begins at step 500 in which the IAU is awaiting an interrupt request message (IRQ) from the Interrupt Bus. Upon receipt of the IRQ, the IAU checks to see if it is designated as a destination in step 501, and if not, the IAU discards the message and returns to step 500. If the IAU is a designated destination, step 503 checks if the IRQ is a an NMI, SMI, INIT, ExtINT or an RR (remote-real) type of interrupt and, if so, accepts the message in step 504 and returns to step 500. If not, the process proceeds to step 505 where the delivery mode is checked. If it is fixed mode delivery, step 506 checks to see if an interrupt slot is available and, if not, sets the status bit to retry in step 507, discards the message in step 502 and returns to step 500. If an interrupt slot is available, step 508 checks if the status is a retry and, if so, discards the message in step 502 and then returns to step 500. If it is not a retry, the IAU accepts the message in step 509 and returns to step 500. If the delivery mode in step 505 is lowest priority, step 510 checks if the IAU is a focus and, if so, accepts the message in step 513. Otherwise, the process moves to step 512 where it checks if another IAU is a focus and, if so, discards the message in step 513 and proceeds back to step 500. If no focus exists, step 514 checks if an interrupt slot is available and, if not, sets the status to retry and returns to step 500 after discarding the message in step 502. Otherwise, if an interrupt slot is available, arbitration is invoked in step 516 and, if the IAU wins the arbitration in step 517, it accepts the message and returns to step 500. If the IAU loses the arbitration, the message is discarded in step 502, and the process returns to step 500.

Each IAU tracks the priority of its local processor. Processor priority may change each time the processor switches tasks (process, thread), the processor's current task raises or lowers its priority, the processor enters an interrupt handler, or the processor returns from an interrupt handler.

Task switching and task priority changes are the result of explicit software action. The operating system may define a number of task scheduling classes. Alternatively, different classes can be assigned to user code versus system code. If tasks in different classes are executing when an interrupt comes in, then it may be advantageous to interrupt the processor currently running the task in the least important class. Clearly, if one processor is idle while others are doing work, the idle processor would be the obvious target for servicing the interrupt. This implies that there is use in defining priority levels below all interrupt levels that can participate in lowest priority delivery selection.

At times, the operating system may need to block out interrupts from being serviced. For example, to synchronize access to a shared data structure between a device driver and its interrupt handler, the driver raises its priority so that it is equal to, or higher than, the interrupt's priority.

The IAU supports this via its Task Priority Register (TPR) 314 of FIG. 8. Software that wants to make use of this is required to inform its IAU of the priority change by updating the Task Priority Register. TPR 314 is 8 bits wide providing up to 256 distinct priorities. The 4 MSB of this register correspond to the 16 interrupt priorities, while the 4 LSB provide more precision. Priorities are best notated as x:y, where x is the value of the 4 MSB and y is the value of the 4 LSB. For example, TPR values {0:y}, with $0<=y<=15$ (and zero in the 4 MSB), can be used to represent the priorities of the task scheduling classes described above (y=0 for idle; y=1 for background; etc.). Except for interrupts with vectors 0–15 (which are often predefined by the processor) which all have priority 0:0, the priorities of other all interrupts and their handlers is {x:0} with $1<=x-<=15$ and is above the base task priorities {0:y}. Note that y is only used in lowest priority arbitration. For example, interrupt vector 123 has priority 7:0 (i.e., the integer part of 123/16=7) and can be masked by any task that raises its priority to a value equal or higher than 7:0. FIG. 16 shows the bit assignments for TPR 314.

From the information in the IAU's Task Priority Register and the priority information derived from the IAU's In Service Register, the IAU computes the Processor Priority value and stores it in the Processor Priority Register 306. The Processor Priority value is computed as the maximum of: Task Priority (4 MSB), and the priority of the highest order ISR bit set ((vector/16):0). This value is used to determine whether or not a pending interrupt can be dispensed to the processor.

The IAU computes the priority of the next interrupt to be accepted in the lowest priority mode by using the values in TPR, ISR, and IRR registers. The computed value is stored in the lowest priority Arbitration ID Register 307 of FIG. 8. The priority value is computed as the maximum of: Task Priority (4 MSB), the priority of the highest order ISR bit set ((vector/16):0), and the priority of the highest order IRR bit set ((vector/16):0). This value is used during arbitration as part of lowest-priority interrupt delivery.

Once an IAU accepts an interrupt, it guarantees the delivery of the interrupt to its local processor. Dispensing a maskable interrupt to the local processor begins when the IAU delivers the interrupt to its processor core. If the processor has interrupts enabled, it will service the interrupt. The IAU delivers the 8-bit vector of the highest priority pending interrupt to the processor core during the INTA cycle. The INTINTA protocol causes the interrupt's ISR bit to be set and IRR bit to be cleared. The IAU will mask all the pending interrupts equal to, or less than, the priority level of the current ISR until the EOI for the current interrupt is received.

A situation may occur when the processor raises its Task Priority at or above the level of the interrupt for which the local processor INT signal is currently being asserted. When the INTA cycle is issued, the interrupt that was to be dispensed has become masked. In this case, the associated IAU will return a Spurious Interrupt Vector to the processor core. Dispensing the Spurious Interrupt Vector does not affect the ISR registers, so the software handler for this vector should just return without EOI. If the vector is shared with a valid interrupt, then the handler can read the vector's bit in the ISR register to check if it is invoked for the valid interrupt (ISR bit set) or not (ISR bit clear). Given the range of 256 vectors, overloading the spurious interrupt with a valid interrupt is not expected to be common practice. The Spurious Interrupt Vector returned by the IAU is programmable.

All IAUs initialize in a disabled state after power-up. A disabled IAU only responds to INIT, NMI, SMI, and RR messages. Pending interrupts in the IRR and ISR registers will be kept and will require masking or handling by the local processor. The IAU must be explicitly enabled before it can start accepting other Interrupt Bus messages. When disabled, system software must avoid loading ICR (Interrupt Command Register) 305 if no interrupt message transmission is to be allowed. However, a disabled IAU listens to all Interrupt Bus messages in order to keep its Arb ID in Arb ID Register 307 up to date with the rest of the system IAUs. Software in the local processor can enable or disable the associated IAU by programming bit 8 of Spurious Interrupt Vector (SIV) Register 325. Also, bit 9 of the S1V Register enables or disables focus processor checking when in the lowest priority delivery mode.

FIG. 17 shows the bit assignments for the SIV Register 325. Bits 0-7 are hardwired logical ones for release during an INTA cycle when all pending interrupts are masked or when no interrupt (IRR) is pending. Bit 8, when zero, places the IAU in the disabled state. Bit 9, when set to logical zero, enables focus processor checking.

Before returning from the interrupt handler, software must issue an End-of-Interrupt (EOI)command to its associated IAU EOI Register 315. This tells the IAU to clear the highest priority bit in the ISR register because the interrupt is no longer in service. Upon receiving the EOI, the IAU goes through prioritization by returning to the next highest priority activity. This can be a previously interrupted handler (from ISR), a pending interrupt request (from IRR), or an interrupted task (from Task Priority).

Upon receiving an EOI, if the highest bit in the ISR register is for a level-triggered interrupt, the IAU sends an EOI message to all IDUs to deassert the corresponding Remote IRR bit. As shown in FIG. 18, the choice of code for EOI is arbitrary.

Because all IAUs typically occupy the same address range, an IAU's registers can only be accessed by the associated local processor. From a system debugging point of view, this means that a large amount of state information could become inaccessible if its associated processor hangs up for whatever reason. To assist in the debugging of multiprocessor systems, the IAUs support a mechanism that provides read-only access to any register in any other IAU in the system.

To read any register in a "remote" IAU, the processor writes to the Interrupt Command Register 305 specifying a Delivery Mode of "Remote Read." The remote IAU is specified in the Destination field of the Interrupt Command Register in the usual fashion. Debug software selects a single IAU by using the target IAU ID in physical destination mode. Because no vector is associated with remote register access, the Vector field in the Interrupt Command Register is used to select the individual remote 32-bit register to be read. The selector value corresponds to the address (offset) of the register in the IAU's address space. Sending a "Remote Read" command results in sending an MPIC message on the Interrupt Bus. The destination IAU responds by placing the 32-bit content of the selected register on the Interrupt Bus. This value is read by the sending IAU and is placed in the Remote Register 304 where software can get at it using regular register access to its local IAU.

The Remote Register is software read-only. The contents of the Remote Register is available when the Delivery Status in the Interrupt Command Register has become "Idle" again. As shown in FIG. 19, Remote Register 304 is at address FFE0_00C0.

Each IAU contains a hardwired Version Register 317 that identifies different implementations by their version code. This allows software to provide compatibility between different implementations. Version Register 317 also stores a hardwired Local Vector Table entry corresponding to the highest entry in the IDU Redirection Table. FIG. 20 shows the bit assignments of the Version Register.

Each IAU has a RESET input signal connected to its local processor Reset line. Both the IAU and the processor are reset simultaneously. All IAUs obtain their IDs at the falling edge of Reset.

After a power-up Reset, IRR, ISR, TMR, ICR, TPR, Holding Registers, Timer Initial Count Registers, Timer Count Register, P,R, LDR, and Divide Configuration Register are reset to logical zero. Local Vector Table entries are reset to zero except that the Mask bits are set to 1s. Destination Format register is reset to all 1s. IAU ID Register values are loaded from the processor. All internal state machine states are reset. Also, the Interrupt Bus is disabled by setting bit 8 of the Spurious Interrupt Vector Register to zero.

Initialization Reset (INIT) has the same effect as power-up Reset except that the IAU ID Register is not loaded by the processor. After an INIT Deassert message is broadcast, all IAUs load their Arbitration ID Register 307 with values from their ID Registers 301.

E. Interrupt Bus

In one embodiment, the Interrupt Bus 115 is a three-wire synchronous bus connecting all IDUs and IAUs. Two of the wires are used for data transmission and the third is a clock. Only one of the data transmission wires is required for Interrupt Bus arbitration.

The Interrupt Bus is logically a wire-OR, and electrically an open-drain, connection providing for both bus use arbitration, and arbitration for lowest priority. Being open-drain, the bus is run at a "comfortable" speed such that design-specific termination tuning is not required. Furthermore, each MPIC agent receiving a message or participating in an arbitration must be given enough time in a single bus cycle to latch the bus and perform some simple logic operations on the latched information in order to determine whether the next drive cycle must be inhibited. The Interrupt Bus 115 speed operates at approximately 16 MHz.

All the values mentioned in the protocol description below are logical values; i.e., "Bus Driven" is logical 1 and "Bus Not Driven" is logical zero. The electrical values are zero for logical 1, and one for logical 0.

The Interrupt Bus 115 uses one wire arbitration to win the bus ownership. A rotating priority scheme is used for bus arbitration. The winner of the arbitration becomes the lowest priority agent and assumes an Arb ID of zero. All other agents, except the agent whose Arb ID is equal to 15, increment their Arb IDs by one. Arb IDs are changed (incremented or assumed) only for messages that are transmitted successfully. A message is transmitted successfully if no error was reported for that message.

An MPIC agent can acquire the Interrupt Bus using two different priority schemes: Normal or EOI. EOI has the highest priority. EOI priority is used to send EOI messages for level interrupts from IAU to IDU.

When an agent requests the bus with EOI priority, all others requesting the bus with normal priorities back off.

A bus arbitration cycle starts by the agent driving a start cycle (bit 0=eoi, bit 1=1) on the Interrupt Bus. Bit 0=1 indicates "EOI" priority, and bit 0=0 indicates normal priority. Bit 1 should be 1.

For cycles 2-5, the agent drives the Arbitration ID onto bit 0 of the bus. High-order ID bits are driven first, successive cycles proceeding to the low bits of the ID. All losers in a given cycle drop off the bus using every subsequent cycle as a tie breaker for the previous cycle. This procedure provides "fairness" by ensuring that any agent cannot get the bus more than once before any other agent has a chance. Thus, if all agents try to access the bus simultaneously, repeated application of this procedure will guarantee that each agent accesses the bus only once before all agents have had access.

After bus arbitration, the winner is granted exclusive use of the bus and will drive its actual message on the bus. MPIC messages come in four formats: 14 cycle EOI message, 21 cycle Short message, 32 cycle Lowest Priority message, and 39 cycle Remote Read message. All agents on the Interrupt Bus know the length of an interrupt message by checking the appropriate fields in the message.

For level-triggered interrupts from an IAU to an IDU, an EOI priority message is used. The message includes the interrupt priority vector (V[0:7]). The IDU receiving the message resets the Remote IRR bit for that interrupt. If the interrupt signal is still active after the IRR bit is reset, the IDU will treat it as a new interrupt. FIG. 21 shows the protocol format for the EOI message for level-triggered interrupts.

Short messages are used for the delivery of Fixed, NMI, SMI, Reset, ExtINT, and LP with focus processor interrupts and are formatted as shown in FIG. 22. The delivery mode bits (M[0:2]) specify the short message format that takes 21 bus cycles.

Cycles 1 is the start cycle. Cycles 2-5 are for bus arbitration, as described earlier. MPIC ID bits are sent on the bus one bit at a time. Only one data bus bit is used for this. The other bit should be zero.

Cycles 6 and 7 together give Destination mode and Delivery mode bits. Cycle 8 gives Level and Trigger mode information.

Cycles 10-13 are the 8-bit interrupt Vector. The Vector is only defined for Delivery Modes Fixed and Lowest priority. For Delivery Mode of "Remote Read," the Vector field contains the address of the register to be read remotely.

If DM is zero (Physical Mode), then cycles 15 and 16 are the MPIC ID and cycles 13 and 14 are zero. If DM is 1 (Logical Mode), then cycles 13-16 are the 8-bit Destination Field. The interpretation of the Logical Mode 8-bit Destination field is performed by the local units using the Destination Format Register. Shorthands of "all-including-self" and "all-excluding-self" both use Physical Destination mode and a destination field containing MPIC ID value of all 1s. The sending MPIC agent knows whether it should or should not respond to its own message.

Cycle 17 is a Checksum (CS) over the data in cycles 6-16. This field is the cumulative add (mod 4) of all data bits (DM, M0-3, L, TM, V0-7, D0-7). The (single) agent driving the message provides Checksum in cycle 17.

Cycle 18 is a postamble cycle driven as 00 by all agents to perform various internal computations based on the information contained in the received message. One of the computations takes the computed Checksum of the data received in cycles 6-16 and compares it against the value in cycle 18. If any agent computes a different checksum than the one passed in cycle 17, then that agent will signal an error on the Interrupt Bus in cycle 19 by driving it as 11. If this happens, all agents will assume the message was never sent and the sender must try sending the message again, which includes rearbitrating for the Interrupt Bus. In Lowest Priority delivery, when the interrupt has a focus processor, the focus processor will indicate this by driving 10 during cycle 19. This tells all the other agents that the interrupt has been accepted, the arbitration is preempted, and short message format is used. Cycle 19 and 20 indicate the status of the message, i.e., accepted, check sum error, retry, or error. FIG. 23 shows the status signals combinations and their meanings for all delivery modes.

The Lowest Priority (without focus processor) message format of FIG. 24 is used to deliver an interrupt in the Lowest Priority Mode in which it does not have a focus process. Cycles 1-21, for this message, is same as for the short message discussed above. Status cycle 19 identifies if there is a focus processor (10), and a status value of 11 in cycle 20 indicates the need for lowest priority arbitration. Cycles 21-28 are used to arbitrate for the lowest priority processor. The processor which take pan in the arbitration drive their processor priority on the Interrupt Bus. Only IAUs which have "free interrupt slots" in IRR will participate in the lowest priority arbitration.

Cycle 29-32 are used to break tie in case two more processors have lowest priority. The bus arbitration IDs are used to break the tie. Cycle 33 is an idle cycle.

The Remote Read message is used by an IAU for reading the register in another IAU. The message format is same as short message for the fnst 21 cycles. Cycle 21-36 contain the remote register address data. The status information in cycle 37 specifies if the data is good or not. Remote Read cycle is always successful (although the data may be valid or invalid) in that it is never retried. The reason for this is that Remote Read is a debug feature, and a "hung" remote IAU that is unable to respond should not cause the debugger to hang. FIG. 25 shows the message format.

Each IAU has an Error Status Register (FIG. 26) which records all the errors detected by that unit. This register is a read-only register and the bits in the register, except for the "reserve" bit, get reset once they are read. The "reserve" bit is reset as a result of an INIT message. Whenever a bit is set in this register, a TRAP will be generated to the processor core (through the error signal). Until the local processor reads this register, more errors can accumulate. Detecting the error on the Interrupt Bus is the IAU's responsibility. IDUs do not have Error Status Registers and hence do not participate in the error logging. The IDUs participate in the Bus Status cycles to notify the IDUs if it has detected any errors. The error register bit definitions are given below and shown in FIG. 26.

Send CS Error: The IAU sets this Check Sum Error bit when it detects a check sum error for a message it sent.

Receive CS Error: The IAU sets this bit when it detects a check sum error for a message that was received by it.

Send Accept Error: The IAU sets this error bit when it detects that the message it sent was not accepted by any agent on the bus.

Receive Accept Error: The IAU sets this error bit when the message it received was not accepted by any agent on the bus, including itself.

BIST Error: The IAU sets this bit to indicate the BIST (Built In Self Test) error.

Send Illegal Vector: This bit is set when the IAU detects an illegal vector in the message that it is sending on the bus.

Receive Illegal Vector: This bit is set when the IAU detects an illegal vector in the message it received. This includes the illegal vector code in the Local Vector Table interrupts and self interrupts from ICR.

Illegal Reg. Address: This bit is set when the local processor tries to access a register that is not implemented in the associated IAU.

Arbitration is also used to find the IAU with the lowest processor priority. Lowest-priority (LP) arbitration uses the value of the IAU's Processor Priority value appended with a 4-bit Arbitration ID to break ties in case there are multiple IAUs executing at the lowest priority. All 8 bits of the Processor Priority Register are used for LP arbitration.

F. Timer Architecture

Each IAU contains one 32-bit wide programmable binary timer for use by the local processor. MPIC uses the CPU Bus Clock to generate its clock base. The timer can be programmed to operate in either one-shot mode or periodic mode. The timer can be configured to interrupt the local processor with an arbitrary vector. A Divide Configuration Register is provided for use by software to select the timer clock frequency for the timer operation. The timer clock is derived from the CPU bus clock.

FIG. 27 shows the format of the Divide Configuration Register 321. Bits 3, 1, and 0 contain the coded divide-by factor which is applied to the CPU Bus Clock to produce divided-by factors of 1, 2, 4, 8, 16, 32, 64, and 128.

Software starts a timer going by programming its Initial Count Register 320. The timer copies this value into the Current Count Register 319 and starts counting down at the rate of one count for timer clock pulse. The IAU timer has a programmable mode which can be One-Shot or Periodic. After a timer reaches zero in One-Shot mode, the timer simply stays at zero until it is reprogrammed. In Periodic mode, the timer automatically reloads its Current Count Register from the Initial Count Register and starts counting down again.

The timer interrupt generation can be disabled or enabled, and an arbitrary interrupt vector can be specified. When enabled and the timer reaches zero, an interrupt is generated at the IAU. Timer-generated interrupts are always treated as edges. They can only generate maskable interrupts to the local processor.

A timer set up with its interrupt masked is useful as a time base that can be sampled by the local processor by reading the Current Count Register for the purpose of measuring time intervals. By mapping the IAU's register space into a read-only user page, safe and efficient performance monitoring of user programs can be supported.

If desired, software can ensure that periodic timer interrupts on the different IAUs are staggered such that they do not all deliver their interrupt (e.g., a time slice interrupt) to their local processor at the same time. This staggering avoids bursts of contention for shared resources (bus, cache lines, dispatch queue, locks). Randomness occurring "naturally" may be sufficient to ensure staggering.

The Timer Vector format used in Local Vector Table 322 is shown in FIG. 28. Vector[0:7] is the 8-bit interrupt vector to be used when the timer generates an interrupt. Bit 12 is the delivery status bit. Bit 16 is used to indicate masked or not masked, and bit 17 indicates one-shot or periodic timer mode.

G. Functional Redundancy Checking in MPIC System

A functional redundancy checking (FRC) system, used in high reliability computing systems, employs two CPUs, where one CPU, designated as the master, has the responsibility to perform the programmed tasks while the second, or checker CPU using the same program as the master CPU, monitors the activities of the master. The checker CPU generates the same set of commands and reads the same data as the master CPU. However, the checker CPU does not drive data on any common bus, but instead monitors what the master CPU drives on a common bus and compares that with what the checker CPU would have driven on the bus if it had been the master CPU. If the checker notes a discrepancy, then it generates an error signal. Without additional information, it cannot be determined whether the master or checker CPU is at fault.

In general, Interrupt Bus 115, as shown in FIG. 2, need not be synchronous with any CPU in a multiprocessor system. The block diagram of FIG. 29 shows the means by which an IAU accepts interrupts when the interrupt bus clocks (I-BUS-CLK) and CPU bus clock (CPU-BUS-CLK) rates have an arbitrary relationship. Interrupt data (I-DATA) is applied to the D-input of D-type Flip-Flop 401 and is latched by I-BUS-CLK. Because I-DATA is an output of a similar flip-flop that is clocked by I-BUS-CLK, I-DATA is assured to meet the set-up and hold-time of flip-flop 401.

The latched output, Q, of flip-flop 401 is connected to the D input of D-type Flip-Flop 402 which is clocked at its CLK input by CPU-BUS-CLK. Because of the arbitrary relationship of the rates of I-BUS-CLK and CPU-BUS-CLK, the set-up and hold-time requirements of flip-flop 402 may be violated causing flip-flop 402 to become metastable at times. Consequently, D-type Flip-Flop 403 is provided to ensure synchronization of I-DATA to CPU-BUS-CLK, allowing the Q output of Flip-Flop 403 to be used with the internal logic running synchronously with CPU-BUS-CLK. The means shown in FIG. 29 are sufficient to ensure synchronization in a non-FRC system.

In an FRC system both master and checker CPU received common input at their input pins. In order for both master and checker CPU to run in lock-step requires that both CPUs execute the same instruction on the same data during the same clock period. This cannot be guaranteed when the synchronizing means of FIG. 29 is used because of the impossibility of guaranteeing identical behavior of the master and checker logic due to slight differences in component delays. Because Flip-Flop 402 can be in a metastable state, it is possible that flip-flop 403 associated with the master CPU will see its input changed one clock earlier or later than the logic associated with the checker CPU. FIG. 30 shows one example of this phenomenon.

In FIG. 30, waveform (a), the I-BUS-CLK signal causes Flip-Flop 401 to sample waveform (b), the I-DATA signal, and produce the Q output waveform (c)

which is assumed to be the same for both the master and checker synchronizing units. CPU-BUS-CLK, waveform (d), which is assumed to be the same for both master and checker, causes the D-input of Flip-Flop 402 to be sampled high by the sixth clock transition of CPU-BUS-CLK, producing the Q output waveform (e) of the master flip-flop 402 a fraction of a CPU-BUS-CLK period later. The Q output of the master flip-flop 402 is again sampled by CPU-BUS-CLK by the master unit flip-flop 403 at cycle 7 causing the flip-flop 403 Q output shows as waveform (f).

If the checker unit Flip-Flop 402 is in the metastable state at the sixth CPU-BUS-CLK transition because of the close coincidence of the transition of waveform (c) with the sixth CPU-BUS-CLK transition, the checker unit Flip-Flop 402 Q output may not change state until the seventh CPU-BUS-CLK cycle causing the delayed transition shown in waveform (g). Consequently, checker unit flip-flop 403 may not sample the state change of waveform (g) until the eight CPU-BUS-CLK cycle causing the Q output waveform (h). Clearly, output waveform (f) of the master unit is not in lockstep with output waveform of the checker unit.

In order to allow an FRC subsystem to operate in an MPIC system, the synchronization ambiguity must be resolved. FIG. 31 shows how an MPIC system can accommodate an FRC CPU pair.

Comparison of FIG. 31 with FIG. 2 shows that, except for the FRC CPU pair 200, the remaining part of the MPIC is the same. For the sake of clarity, Figure 31 does not show additional non-FRC CPUs (such as CPUs 112 of FIG. 2) connected between the system bus 110 and the Interrupt Bus 115. However, it should be understood that they may be present and operate together with the FRC CPU pair 200 in the MPIC environment as previously described.

In FIG. 31, the master CPU 210 is shown together with its clock (CPU CLK 214) which is supplied to checker CPU 211 so that both Master and Checker CPU run on a common clock. In addition, master IAU 212 is shown to have an integer clock Frequency Divider 216 which accepts CPU CLK 214 and produces a subharmonic clock signal on line 219 for use as the Interrupt Bus 115 clock (I-BUS CLK).

Interrupt Bus 115 is a synchronous serial bus that typically operates at an 11 MHz while CPU CLK 214 and 215 typically operate at 66 MHz. Thus, a divide-by-six CLK Divider 216 would provide an 11 MHz I-BUS CLK that is phase synchronous with the 66 MHz CPU CLK 214 because every sixth positive clock transition corresponds to a positive transition of I-BUS CLK, as shown in FIG. 32. Although, in this example, a divide-by-six integer has been shown, any of the well-known divide-by-n circuits, including binary divide circuits, could be used to generate the subharmonic best suited to a particular hardware implementation. The key point is that the clock transitions of the subharmonic I-BUS CLK are made to be in phase with every sixth (or more, generally every n$^{th}$) CPU CLK transitions.

Checker CPU 211 may include a CLK Divider 217 which is identical to CLK Divider 216 so that any functions that depend on the divider, such as the use of any subharmonics generated by the CLK Divider for timer purposes, may be duplicated by checker CPU 211 and checker IAU 213.

In this manner, all IDUs 113 resolve the synchronization ambiguity between the I/O subsystems and the MPIC system by delivering any interrupt synchronously to the I-BUS CLK. The receiving master and checker IAUs then delivers the interrupt to their associated CPUs synchronously with respect to the CPU CLK. This ensures that the master and checker CPUs respond to the interrupt at the same clock transition, maintaining the integrity of clock-by-clock checking in the FRC subsystem.

Additional FRC subsystems can be added to the MPIC system provided that all FRC subsystems either share a common CPU CLK or each FRC subsystem has a clock that is a harmonic (integer multiple) of I-BUS CLK. This could be implemented as shown in FIG. 33(a) where a common clock source, CLK 300, provides a high frequency clock which is a harmonic of the desired I-BUS CLK. The output of CLK 300 is applied to integer divider chain 310 which is a series of concatenated frequency divider circuits producing subharmonically related CPU CLK output signals for use by various FRC subsystems. The lowest frequency clock output from integer divider chain 310 is the internal I-BUS CLK. In this way, each FRC system can operate with a CPU CLK harmonically related to I-BUS CLK and with phase-locked transitions. By means of synchronizer 311, the external I-BUS-CLK is used as a reference to synchronize the internal I-BUS-CLK used by the master and checker CPUs.

FIG. 34 is another alternative scheme for implementing an FRC capability in an MPIC system. Comparison with FIG. 31 shows that the difference resides in the externally supplied Clock Generator 230 in which a CPU CLK generator and an I-BUS CLK generator reside. The CPU CLK is delivered to master and checker CPU CLK inputs 214 and 215, respectively, by means of line 231. The I-BUS CLK drives the I-BUS CLK line of Interrupt Bus 115 via line 232. Common Clock Generator 230 can be used to drive the clocks of additional FRC units as well as non-FRC CPUs using, for example, a circuit such as shown in FIG. 33(b).

FIG. 35 shows a modification of the synchronizer of FIG. 29 that makes it more suitable for use within an FRC system. The apparatus shown is for a single bit of data, but can be extended to accommodate multibit parallel data by duplicating the circuit for each additional bit.

The structure of FIG. 35 is the same as that of FIG. 29 except that Delay Element 405 has been introduced between the Q output of Flip-Flop 401 and the D-input of Flip-Flop 402.

The low-to-high transitions of I-BUS-CLK are made coincident with the low-to-high transitions of CPU-BUS-CLK, even though the spacing between low-to-high transitions is not a fixed number of CPU-BUS-CLK periods. Coincidence between transitions means that both transitions occur within a small prescribed interval of each other and the hold time requirements of D-type Flip-Flop 402 are consistently met. These conditions can be met by adjusting Delay Element 405, over a range up to one CPU-BUS-CLK cycle. For example, in FIG. 35 transitions 0, 1, and 2 of I-BUS-CLK (waveform (b)) are respectively coincident with CPU-BUS-CLK transitions 0, 6, and 13. Waveform (c) is I-DATA which is sampled by I-BUS-CLK and latched at the Q output of Flip-Flop 401, as shown by waveform (d). If delay element 405 is properly adjusted, the delayed output waveform is shown as waveform (e). Because the low-m-high transitions of waveform (e) and CPU-BUS-CLK cycle 7 occur within the prescribed skew tolerance, waveform (f) representing the Q output of flip-flop 402 occurs shortly thereafter as shown by waveform (f). In this manner, flip-flop 402 is guaranteed not become metastable.

FIG. 37 shows an external clock generation circuit that can be used to generate I-BUS-CLK with the required skew relationship with respect to CPU-BUS-CLK. The D-input of D-type Flip-Flop 501 is provided by a stable (crystal generated) source. The sampler input (CLK) of flip-flops 501 and 502 are connected to a 66 MHz source. Flip-Flops 501 and 502 constitute a synchronizer as previously discussed. The output from Flip-Flop 502 is a nominal 10 MHz clock (I-BUS-CLK) that has low-m-high transitions that are coincident with CPU-BUS-CLK low-to-high transitions out of Delay Element 503. Delay Element 503 is used to bring the low-to-high transitions of the 66 MHz signal into a prescribed skew tolerance relative to corresponding low-to-high transition of I-BUS-CLK. Thus, a proper 10 MHz I-BUS-CLK and CPU-BUS-CLK signal pair are generated.

In some microprocessor CPUs an additional internal clock is generated on-chip, the additional internal clock, CPU-CORE-CLK, having a rate that is a fixed ratio relative to the CPU-BUS-CLK rate. FIG. 38 shows a Phase-Locked-Loop (PLL) means for generating a CPU-CORE-CLK that has an integer harmonic rate that is "n" times the CPU-BUS-CLK rate. Because the rate of CPU-CORE-CLK is an integer harmonic of the CPU-BUS-CLK rate, information clocked at the CPU-BUS-CLK rate can be transferred to the CPU-CORE-CLK domain without any synchronization ambiguities and metastability issues arising. Thus, in an alternative embodiment of an FRC system in which MPIC information is captured in the I-BUS-CLK domain, MPIC data is first transformed to the CPU-BUS-CLK domain (by sampling by the CPU-BUS-CLK) and then captured by sampling by the CPU-CORE-CLK.

In still another variant embodiment of an FRC system, I-BUS-CLK, is an integer subharmonic (say 1/N) of CPU-CORE-CLK, and I-BUS-CLK is also an integer subharmonic (say: 1/M) of the CPU-BU S-CLK, so that the ratio of the CPU-CORE-CLK to CPU-BUS-CLK rate is N/M. Such a system may be implemented as shown in FIG. 39. I-DATA is sampled by I-BUS-CLK by Flip-Flop 401 and the output of Flip-Flop 401 is synchronized to CPU-CORE-CLK by means of flip-flops 402 and 403. In this case, CPU-CORE-CLK is derived from CPU-BUS-CLK by means of frequency divider 601 (a divide by M circuit) and Phase-Locked-Lop (PLL) 602 that has a divide by N circuit in the feedback path and thereby produces a CPU-CORE-CLK rate that is related to the CPU-BUS-CLK rate by a ratio of N/M.

FIG. 40 shows an FRC clock and synchronizing system in which the ratio of the CPU-CORE-CLK rate to CPU-BUS-CLK rate is n/m by using a frequency Divide Circuit 406 and PLL-2 in CLK generator 500, and as previously described in FIG. 39. CLK generate 500 also has a Phase-Locked-Loop (PLL-1) operating on CPU-BUS-CLK and producing at its output line 415 a "cleaned-up" version of CPU-BUS-CLK. I-BUS-CLK has a fixed skew relationship with CPU-BUS-CLK. Flip-Flops 401,402, and 403 and Delay Element 405, in the same configuration as shown in FIG. 35, are used to keep the Q-output of Flip-Flop 403 in both the master and checker in lockstep. Additional control line 440 connected to Flip-Flop 403, is an output enable line, which, when active gates the Q output, allowing the state of Flip-Flop 403 to change at the Q output. The Q output of Flip-Flop 403 is connected to the D-input of Flip-Flop 404 and is sampled by CPU-CORE-CLK which latches and makes available the CPU-CORE-CLK domain version of I-DATA.

Enable line 440 is generated by a state machine operating on CPU-CORE-CLK, in accordance with the following rule: upon sensing a low-to-high transition of CPU-BUS-CLK, and a following (or simultaneous) CPU-CORE-CLK low-to-high transition, generate control signal ENABLE high for one CPU-CORE-CLK period. State machine 450 may be implemented for one or more N/M ratios as shown in the examples of FIGS. 41, 42, and 43.

FIG. 41 shows an example of the operation of the synchronizing apparatus of FIG. 39 when the ratio of CPU-CORE-CLK rate to CPU-BUS-CLK rate is 9/4. Waveforms (a) and (b) represent the CPU-CORE-CLK and CPU-BUS-CLK waveforms, respectively. Wave (c) represents the flip-flop Q enable control waveform, ENABLE, which is generated by state machine 450 operating as described above. Thus, the active (high) state at time 0 of waveform (c) is generated, after a short delay by the coincident onset of the low-to-high transitions of CPU-CORE-CLK 0 and CPU-BUS-CLK 0. The next active state is generated after CPU-BUS-CLK low-to-high transition 1 and the following CPU-CORE-CLK transition 3. Similarly, CPU-BUS-CLK transitions 2, 3, and 4, together with CPU-CORE-CLK transitions 5, 7, and 9 activate ENABLE high states 2, 3, and 4. (It should be noted that the ENABLE waveform (c) is periodic repeating after each 4 cycles of CPU-BUS-CLK and each 9 cycles of CPU-CORE-CLK.) Waveform (d) represents the Q-state of flip-flop 403 while waveform (e) represents the Q-state of Flip-Flop 404 which is the result of sampling waveform (e) by CPU-CORE-CLK at CPU-CORE-CLK transitions 1, 4, 6, 8, 10, ... In this manner, the desired transformation of I-DATA to the CPU-CORE-CLK sampling domain is achieved.

FIGS. 42 and 43 are two additional examples of generating control signal ENABLE from waveforms CPU-BUS-CLK and CPU-CORE-CLK. FIG. 42 is for the case when the ratio of CPU-CORE-CLK rate to CPU-BUS-CLK rate is 5/2 while FIG. 43 is for a ratio of 10/3. It should be noted that the ENABLE waveform of FIG. 42 has a period 5 CPU-CORE-CLK periods while for FIG. 43 the period is 10 CPU-CORE-CLK periods.

What is claimed is:

1. A multiprocessor programmable interrupt controller system for operation in a multiprocessor system having a common system bus, at least one I/O peripheral subsystem with a set of interrupt request signal lines, and at least two processor units, one processor unit being a functional redundancy checking (FRC) unit having a master processor and a checker processor operating with common core and CPU bus clocks, the multiprocessor programmable interrupt controller system comprising:
   a) an interrupt bus synchronizing clock signal with a rate that is less than one half the common core clock rate;
   b) a synchronous interrupt bus for transmitting the interrupt bus synchronizing clock signal, for interrupt request data communication, and for arbitration messages for control of the interrupt bus;

c) an interrupt delivery unit (IDU) connected to the interrupt bus comprising:
   i) a set of interrupt request signal input pins for accepting interrupt request signals from a set of I/O peripheral interrupt request lines, an interrupt request signal indicated by activating a corresponding input pin,
   ii) a redirection table, coupled to the interrupt request signal input lines, for selecting an interrupt request message corresponding to the active input lines, the interrupt request message comprising an interrupt vector containing interrupt priority level, servicing mode, and processor selection information,
   iii) means, coupled to the redirection table and to the interrupt bus, for broadcasting the redirection table interrupt message on the interrupt bus, and
   iv) means, coupled to the interrupt bus, for arbitrating for control of the interrupt bus; and
d) an interrupt acceptance unit (IAU) connected to the interrupt bus and to an associated processor unit comprising:
   i) means for receiving interrupt request messages that have been broadcast on the interrupt bus,
   ii) means for accepting interrupt requests for which the associated processor is eligible to service,
   iii) means for pending accepted interrupt request messages until the associated processor is available to service the interrupt request,
   iv) means for broadcasting interrupt request messages from its associated processor unit on the interrupt bus,
   v) means for arbitrating control of the interrupt bus connected to the interrupt bus,
   vi) means for lowest priority mode arbitration on the interrupt bus between IAUs eligible to service a given interrupt request, wherein an IAU associated with an eligible processor operating on a task of lowest priority relative to all other eligible processors is selected to service the given interrupt request, and
   vii) means for synchronizing IAU-accepted interrupt request messages with the associated processor core clock.

2. The controller of claim 1 wherein the synchronous interrupt bus comprises three wires, one wire for transmitting the interrupt bus synchronizing clock signal, a first and second data wire for interrupt request communication, the first data wire also used for single-wire arbitration messages.

3. The controller system of claim 2 wherein the IDU means and the IAU means for interrupt bus arbitration are each logically-OR connected to the interrupt bus for arbitration of the control of the interrupt bus, each IAU and IDU having a preassigned unique, fixed length, binary coded arbitration identification number assigned from a set of N integers, where N is the total number of IDUs and IAUs, hereinafter referred to as agents, the agents using a method of arbitration comprising the following steps:
   a) each agent desiring control of the interrupt bus at a given instant of time arbitrates, by serially driving the first data wire with its arbitration identification number, one bit per bus cycle in descending order of bit significance;
   b) each agent of step (a) monitoring the first data wire during each interrupt bus cycle of the arbitration procedure so that, if the first data wire is in a logically asserted state in any given arbitration cycle when its corresponding bit of its arbitration identification is not logically asserted, a non-asserting agent loses and drops out of the arbitration; and
   c) repeating steps (a) and (b) until all bits of the arbitration identification number have been exhausted so that an agent remaining after the last bit is applied wins the arbitration and control of the interrupt bus.

4. The controller system of claim 3 wherein the arbitration is followed by a procedure for adjusting the arbitration identification numbers of each agent in order to distribute assignment of interrupt request assignment amongst all eligible processors, the adjusting procedure comprising the following steps:
   a) the winning agent is assigned an arbitration identification number of zero;
   b) incrementing by one the arbitration identification number of all other agents except the agent with arbitration identification number N-1; and
   c) assigning the arbitration identification of the winning agent to the agent with arbitration identification of N-1.

5. The controller system of claim 3 wherein the agents are electrically open-drain connected to the interrupt bus for reduced loading on the interrupt bus when not driven by an agent.

6. The controller system of claim 2 wherein the means for lowest priority mode arbitration for finding an eligible processor with the current lowest priority task further comprises means for:
   a) assigning to each IAU a lowest priority task number corresponding to each IAU associated processor a current processor task priority;
   b) forming a logical complement of each lowest priority task number;
   c) each eligible IAU sequentially driving the first data wire with its complemented lowest priority task number beginning with its most significant bit in descending bit order, one bit at a time for each interrupt bus clock cycle;
   d) each eligible IAU monitoring the first data wire for each interrupt bus clock cycle so that, if the first data wire is logically asserted when a given IAUs corresponding bit is not asserted, the given IAU drops out of the lowest priority mode arbitration and all other eligible processors continue arbitration; and
   e) repeating steps (c) and (d) until all bits of the complemented lowest priority task number has been used and a single IAU remains, the remaining IAU being the lowest priority mode arbitration winner.

7. The controller system of claim 6 further comprising means for appending to each IAU lowest priority task number, each IAU's arbitration identification number as a field of lower order bits for the purpose of selecting a lowest priority mode winner when more than one eligible processor's task is of equal lowest priority.

8. The controller system of claim 1 wherein the IAU further comprises remote read means for an IAU to request reading the contents of a register with a preassigned address in a target IAU, each IAU having a preassigned binary coded identification number, each of the remote read means comprising means for:
   a) selecting a physical destination mode of interrupt bus message delivery;

b) specifying the target IAU identification number as the address of the destination;
c) placing a number corresponding to the address of the register whose contents are to be read and causing the target IAU to place the contents of the addressed register on the interrupt bus; and
d) reading of the register contents on the interrupt bus by the IAU requesting the remote IAU register read.

9. The controller system of claim 1 wherein the IAU is associated with the master CPU and further comprises a second IAU associated with, and coupled to, the checker CPU for bidirectional transfer of interrupt-related messages, and unidirectionally coupled to the interrupt bus solely for receiving messages broadcast on the interrupt bus.

10. The controller system of claim 1 further comprising a clock generator coupled to the FRC unit, for generating FRC CPU bus and core clock signals, each FRC CPU bus and clock signals being an integer harmonic of the interrupt bus synchronizing clock signal.

11. The controller system of claim 10 wherein the clock generator further comprises means for generating an interrupt bus synchronizing clock signal, coupled to the interrupt bus for transmitting the interrupt bus synchronizing clock signal.

12. The controller system of claim 1 wherein the IAU synchronizing means comprises means for synchronizing IAU-accepted interrupted request messages with the associated processor CPU bus clock.

13. The controller system of claim 1 wherein the IAU synchronizing means comprises a first stage synchronizer and second stage synchronizer, the first stage synchronizer for synchronizing IAU-accepted interrupt request messages with the associated processor CPU bus clock, and the second stage synchronizer for synchronizing the first stage synchronizer output with the associated processor core clock.

14. The controller system of claim 13 wherein the second stage synchronizing means further comprises:
a) gate means for gating the fast stage synchronizing means output; and
b) a state machine for generating a gate control signal for controlling the gate means output on and off, turning the gate output on for a prescribed interval whenever the first stage synchronizer output transitions from low to high and a low to high transition of the associated core clock occurs within a core clock period interval of the first stage synchronizer output low to high transition.

15. The controller system of claim 14 wherein the prescribed gate on interval is at least one core clock period.

* * * * *

UNITED STATES PATENT AND TRADEMARK OFFICE
CERTIFICATE OF CORRECTION

PATENT NO.    :  5,410,710
DATED         :  April 25, 1995
INVENTOR(S)   :  Sarangdhar et al.

It is certified that error appears in the above-identified patent and that said Letters Patent is hereby corrected as shown below:

In column 2 at line 43 delete "internapt" and insert --interrupt--

In column 4 at line 28 delete "register" and insert --Register--

In column 6 at line 43 delete "EAU," and insert --IAU,--

In column 6 at line 45 delete "EAU" and insert --IAU--

In column 9 at line 53 delete "DESTINAT/ON" and insert --DESTINATION--

In column 13 at line 3 delete "fast" and insert --first--

In column 15 at line 55 delete "wiggered" and insert --triggered--

In column 18 at line 45 delete "army" and insert --array--

In column 20 at line 48 delete "INTINTA" and insert --INT/INTA--

In column 21 at line 27 delete "handier" and insert --handler--

In column 22 at line 20 delete "P,R," and insert --RR,--

In column 24 at line 29 delete "pan" and insert --part--

UNITED STATES PATENT AND TRADEMARK OFFICE
CERTIFICATE OF CORRECTION

PATENT NO. : 5,410,710
DATED : April 25, 1995
INVENTOR(S) : Sarangdhar et al.

It is certified that error appears in the above-identified patent and that said Letters Patent is hereby corrected as shown below:

In column 24 at line 38 delete "fnst" and insert --first--

In column 28 at line 66 delete "low-m-high" and insert --low-to-high--

In column 29 at line 13 delete "low-m-high" and insert --low-to-high--

In column 34 at line 15 delete "fast" and insert --first--

Signed and Sealed this

Twenty-eighth Day of January, 1997

Attest:

BRUCE LEHMAN

Attesting Officer    Commissioner of Patents and Trademarks